(12) United States Patent
Minuhin

(10) Patent No.: US 6,233,107 B1
(45) Date of Patent: May 15, 2001

(54) ANALOG SELF-SYNCHRONIZATION SUBSYSTEM BASED ON PEAK DETECTION AND POST PROCESSING IN A SAMPLED CHANNEL OF DIGITAL MAGNETIC RECORDING

(75) Inventor: Vadim B. Minuhin, Bloomingon, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/272,722

(22) Filed: Mar. 19, 1999

Related U.S. Application Data

(60) Provisional application No. 60/078,794, filed on Mar. 20, 1998.

(51) Int. Cl.$^7$ ........................................... G11B 5/09
(52) U.S. Cl. ................................. 360/51; 360/65
(58) Field of Search ........................................ 360/65, 51

(56) References Cited

U.S. PATENT DOCUMENTS

| | | |
|---|---|---|
| 5,422,760 | 6/1995 | Abbott et al. . |
| 5,459,757 | 10/1995 | Minuhin et al. . |
| 5,650,954 | 7/1997 | Minuhin . |
| 5,854,717 | 12/1998 | Minuhin . |

OTHER PUBLICATIONS

Roy D. Cideciyan, Francois Dolivo, Reto Hermann, Walter Hirt and Wolfgang Schott, "A PRML System for Digital Magnetic Recording", IEEE Journal on Selected Areas of Communication, vol. 10, (No. 1), pp. 38–56, Jan. 19, 1992.

Kurt H. Mueller and Markus Muller, "Timing Recovery in Digital Synchronous Data Receivers," IEEE Transactions on Communications, vol. COM–24, No. 5, pp. 516–531, May 1976.

F. Jessie MacWilliams and Neil J.A. Sloane, "Pseudo–Random Sequences and Arrays," Proceedings of the IEEE, pp. 1715–1729, Dec. 1976.

National Semiconductor Advanced Peripherals Mass Storage Handbook, pp. 4–29 – 4–45, 1988 Edition.

*Primary Examiner*—Alan T. Faber
(74) *Attorney, Agent, or Firm*—Shawn B. Dempster

(57) ABSTRACT

A magnetic recording readback channel having an equalizer and a self synchronizer is described. The equalizer equalizing an input signal to an approximation of selected waveform. The equalizer including an analog, continuous-time frequency-domain prefilter which generates a preconditioned signal from the input signal. The equalizer further including a sampler which derives discrete-time samples appropriate for sequential sampled data decoding from the preconditioned signal and a sampling clock. The self-synchronizer generating the sampling clock from differentiation of a readback signal by utilizing an analog continuous-time filtering channel which is different from the equalizer and configured in parallel to the equalizer. The self-synchronizer including a phase locked loop which generates the sampling clock from detected magnetic transitions on a magnetic medium and which corrects the sampling clock based upon moments of detected peak pulses in the readback signal. The self-synchronizer further including a timing delay circuit which delays the sampling clock by an optimal amount and calibrates the sampling clock to an optimal phase during a sector preamble readback.

7 Claims, 17 Drawing Sheets

FIG. 4 ANALOG 127-BIT PERIODIC READBACK INPUT SEQUENCE (HEAD RESPONSE)

Distribution of Peak Shifts including those
out of detection window (+-10 indexes)

Distribution of Peak Shifts out of
detection window (+−10 indexes) only

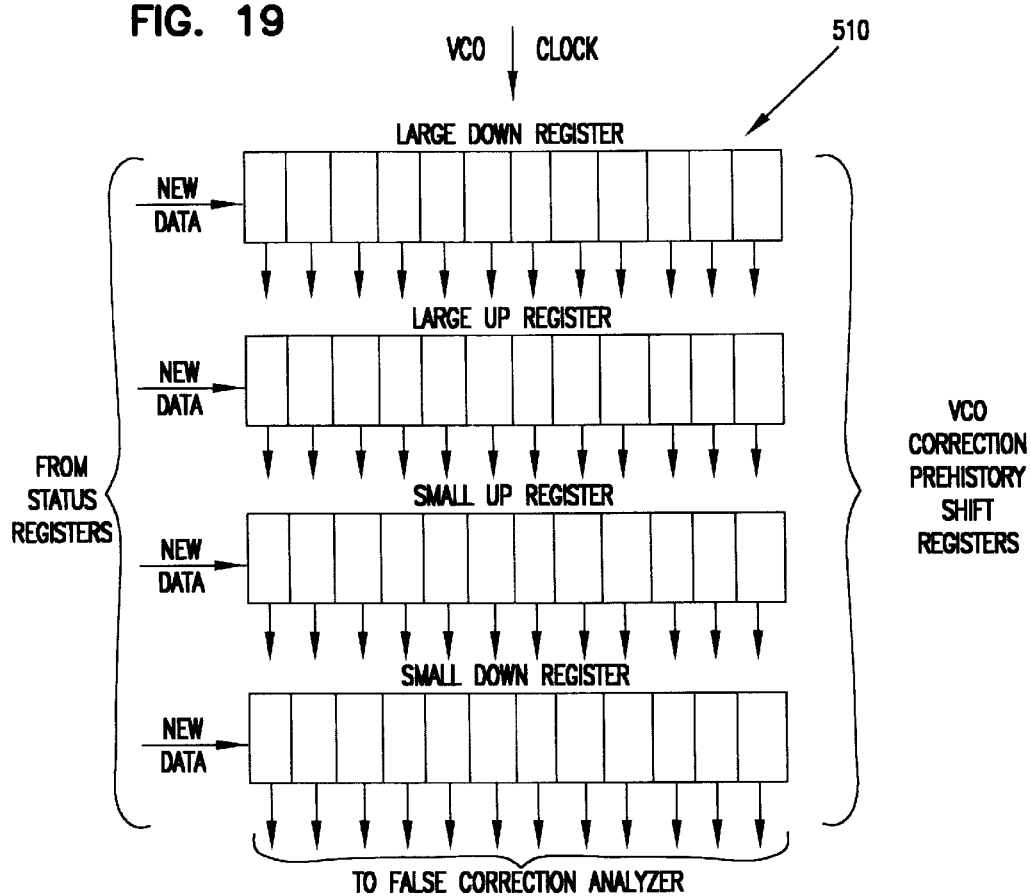
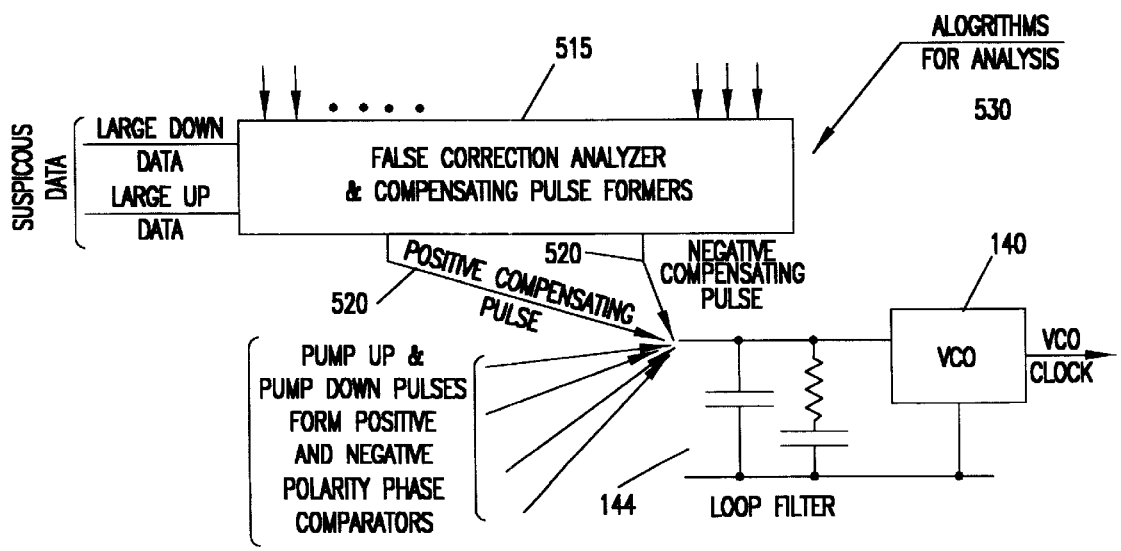
FIG. 19

ANALOG SELF-SYNCHRONIZATION SUBSYSTEM BASED ON PEAK DETECTION AND POST PROCESSING IN A SAMPLED CHANNEL OF DIGITAL MAGNETIC RECORDING

RELATED APPLICATION

This application claims the benefit of U.S. Provisional Application 60/078,794 entitled "Analog Self-Synchronization Subsystem Based On Peak Detection And Post Processing In A Sampled Channel Of Digital Magnetic Recording," field Mar. 20, 1998.

FIELD OF THE INVENTION

This invention relates generally to the field of a digital magnetic recording channels that are used in systems of mass storage of computer data, such as disc and tape drives. More particularly, but not by way of limitations, the invention is directed toward improvements of self-synchronization and, therefore, the reliability of such channels and of overall computer data storage

BACKGROUND OF THE INVENTION

One type of signal processing typically associated with high-density magnetic recording channels is time-domain equalization. Such equalization is used to reshape a readback signal received by the channel to an approximation of a desired target waveform in the time domain, such as used in a Partial Response, Maximum Likelihood (PRML) detection read channel. As will be recognized, reshaping the readback signal allows intersymbol interference (ISI) to be reduced and controlled, facilitating reliable sequential decoding of the digital information stored on disc.

A second type of signal processing typically used in a magnetic recording channel is self-synchronization, which involves synchronization of the rate of data recovery with the rate of incoming readback signal, which varies as a result of the variations of a speed of rotating disc and radial position of the associated head. Typically, such self-synchronization is achieved through the use of a Phase Locked Loop (PLL) frequently referred also as a Phase Locked Ocsillator (PLO) or as a Voltage Controlled Oscillator (VCO), which generates clock signal for the sampling of equalized signals at appropriate moments and for subsequent recovery of the stored data from the samples.

Practical implementations of both equalization and self-synchronization are discussed, for example, in U.S. Pat. No. 5,422,760 entitled "Disc Drive Method Using Zoned Data Recording And Prml Sampling Data Detection With Digital Adaptive Equalization", issued Jun. 6 1995 to Abbott et al and in the paper by Cideciyan et al entitled "A PRML System for Digital Magnetic Recording", IEEE Journal on Selected Areas in Communications, vol. 10, no. 1, Jan 1992. Additionally, for detailed discussion of self-synchronization see U.S. Pat. No. 5,459,757 entitled "Timing And Gain Control Circuit For A PRML Read Channel," issued Oct. 17, 1995 to Minuhin et al. and U.S. Pat. No. 5,854,717 entitled "Self-Synchronization in a Magnetic Recording Channel Utilizing Time-Domain Equalization," issued Dec. 29, 1998 to Minuhin (Minuhin '717), both of which are assigned to the assignee of the present invention.

As taught by these references, self-synchronization is derived from the equalized signal at the output of the equalizer. The basis for this approach is discussed by Mueller's and Muller's in the paper entitled "Timing Recovery in Digital Synchronous Data Receivers", IEEE Transaction on Communications, No.5, May 1976, pp.516–531. It is significant to note that although this approach to self-synchronization was directed toward a digital communication channel and was not developed specifically for magnetic recording channels, practical analog and digital magnetic recording channels utilizing time domain equalization usually use this approach.

Significant limitations, however, have been encountered in the application of the Mueller's and Muller's approach to self-synchronization in magnetic recording channels.

First, the procedures for equalization and self-synchronization are interdependent; that is, to achieve optimal equalization, one needs to employ a clock having an optimal phase (for a given analog input signal), while to derive a clock with an optimal phase one needs an optimally equalized signal.

Second, actual timing error signal for the PLL from the output of the equalizer is corrupted by both the residual equalization error that results from imperfect equalization and by the filtered noise. For certain pattern combinations, the residual equalization error can be indistinguishable from the systematic timing error, so that PLL can be incorrectly driven out of correct phase (and further, for especially "bad patterns", the PLL can be made to lose lock altogether).

Third, in practice, time-domain equalization usually requires a high frequency boost and large mismatch between the target shape and the original "head/media" signal. As a result, significant noise enhancement occurs at the output of the equalizer that further corrupts the timing signal.

Fourth, the locking range of a timing error sensor circuit for sampled signals is generally small, so that in a noisy environment, the PLL may be additionally prone to lose lock.

Finally, in the case of the use of digital equalization, the analog to digital converter (A/D), the equalizer and the signal processing circuit employed to calculate timing error are inside of the PLL. The associated delays from these hardware units result in so-called "transportation delay" or "dead time" which adversely affect the performance and stability of the PLL.

As a result of these and other limitations, there is a need for an improved approach to self-synchronization in a sampled magnetic recording channel which overcomes the deficiencies of the prior art. In addition, a need exists for a solution which enables self-synchronization utilizing relatively low-complexity and low power-consuming circuitry. Also, this solution preferably will provide self-synchronization in a manner such that delays associated with time-domain equalization of readback signal and signal processing delays in data recovery do not affect performance of the PLL. Finally, this solution preferably will provide lock limits that are significantly greater than those used in a prior art, facilitating more reliable operation of the PLL.

The present invention provides a solution to this and other problems, and offers other advantages over the prior art.

SUMMARY OF THE INVENTION

The present invention is also based on realization that the output of the equalizer used for the data recovery is a "bad place" to look for the timing errors. Much better synchronization can be achieved by using a separate parallel analog peak-detection-based clock channel with its own special filter that allows more ISI, but provides better suppression of noise than the filter in the data channel. The required error rate for timing recovery in that channel is much less stringent than that for data recovery because infrequent single errors in PLL correction will not affect correct data recovery, since an analog PLL filter provides substantial integrating action. The present invention anticipates the existence of a programmable delay between outputs of parallel data and clock channels and periodical adjustment (calibration) of that delay to synchronize channel outputs. However, unlike the Minuhin '717 patent identified previously, the peak detection channel of the present invention does not employ traditional low-pass-filtered and low-pass-filtered-and-differentiated readback signal outputs. Rather, the present invention works only with differentiated signals.

Furthermore, the present invention utilizes a special feature of a peak detection channel that was not employed in Minuhin '717. This feature can be explained as follows. When detected peak pulse is erroneously (due to noise or ISI) shifted (incorrectly) into an adjacent detection window, it will be close to the boundary between correct and incorrect window. As well known by those, skilled in the art, the position of peak pulse close to window boundary results in a very strong correction of the VCO, and it may be wrong correction. This feature is exploited in the present invention. The special post-processing procedure and hardware are utilized in the present invention that allows to recognize an event of strong PLO correction, which can be erroneous correction and then either to neutralize this correction immediately by injecting a special current pulse into the PLL filter, or, using a prehistory of previous corrections make decision if this strong correction was in the right or wrong direction. If correction happens to be in a wrong direction, then, again, the special current pulse is injected into the PLL filter to neutralize the effect of false correction. In other words, the PLL filter is used in the present invention as an analog memory elements that for a short time remembers acts of wrongful corrections and then allows to neutralize them. This drastically reduces errors in the timing channel of the present invention and makes it very robust.

The timing recovery according to the present invention is completely decoupled from the equalization, so that equalization is performed on the already synchronized signal and delays associated with equalization do not affect the PLL. Moreover, either digital or analog data recovery with arbitrary large signal processing delay can be employed, without interfering with PLL stability and performance.

In accordance with one embodiment of the invention, a magnetic recording readback channel having an equalizer and a self synchronizer is provided. The equalizer equalizing an input signal to an approximation of selected waveform. The equalizer including an analog, continuous-time frequency-domain prefilter which generates a preconditioned signal from the input signal. The equalizer further including a sampler which derives discrete-time samples appropriate for sequential sampled data decoding from the preconditioned signal and a sampling clock. The self-synchronizer generating the sampling clock from differentiation of a readback signal by utilizing an analog continuous-time filtering channel which is different from the equalizer and configured in parallel to the equalizer. The self-synchronizer including a phase locked loop which generates the sampling clock from detected magnetic transitions on a magnetic medium and which corrects the sampling clock based upon moments of detected peak pulses in the readback signal. The self-synchronizer further including a timing delay circuit which delays the sampling clock by an optimal amount and calibrates the sampling clock to an optimal phase during a sector preamble readback.

These and various other features as well as advantages which characterize the present invention will be apparent upon reading of the following detailed description and review of the associated drawings.

BRIEF DESCRIPTION OF THE DRAWINGS

FIG. 19 illustrates in more details a generic hardware configuration of the post-processing feature in a self-synchronization subsystem.

DETAILED DESCRIPTION

Figure 1:
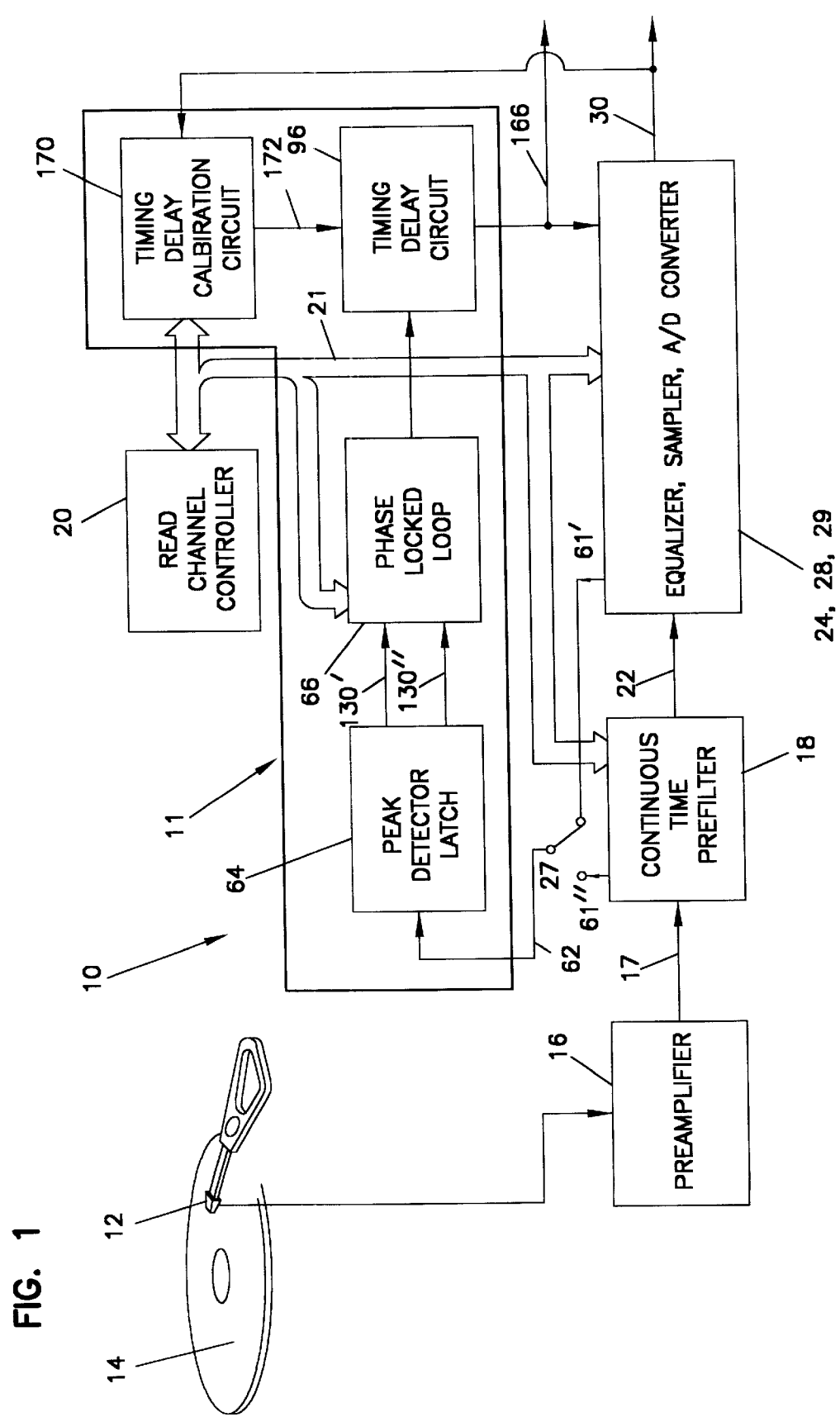
FIG. 1 is a generalized block diagram of a disc drive magnetic recording channel.

Referring now to FIG. 1, a generalized block diagram of a disc drive magnetic recording channel 10 constructed in accordance with a preferred embodiment of the present invention is shown. Channel 10 includes a self-synchronization circuit/subsystem 11, which provides self-synchronization of the channel data recovery process. For purposes of discussion, the channel 10 is contemplated as comprising a PRML read channel employing class PR-4 partial response signaling. It will be appreciate by those skilled in the art that the techniques described herein may readily be adapted for use with EPR4 and $EPR^2 4$ partial response signaling.

As shown in FIG. 1, the channel 10 receives raw readback signal from a head 12 which flies in close proximity to a rotating magnetic disc 14 on which data is stored. The readback signals are amplified in a preamplifier 16, and provided on signal path 17 to an analog continuous-time prefilter 18 which performs preliminary frequency-domain filtering. Such filtering may be adaptively controlled by prefilter parameter signals provided by a read channel controller 20 which issues several control commands on a bus 21.

Once prefiltered, the readback signals are provided by way of signal path 22 to a time-domain equalizer denoted, in general, by numerals 24, 28, 29. As the present invention is directed toward self-synchronization, not toward particular equalizer type, the construction of the time-domain equalizer can vary, depends on the particular application. The equalizer can be of an analog, continuous-time type (as will be discussed hereinbelow, for purpose of disclosure and simulations referred to, see FIG. 2 and pertinent text). It can also be of an analog, discrete-time type (on analog samplers), or it can be a digital synchronous FIR (Finite Impulse Response) filter. What is common for all equalizer types, is that the equalizer 24, 28, 29 has analog continuous-time input and a discrete-time (analog or digital) output. In all cases the equalizer also contains sampler 28 (as shown on FIG. 2) that is controlled by the sampling clock on signal path 166. In the case of a digital FIR filter, the equalizer 24, 28, 29 also includes an A/D converter 29 that is controlled by the same sampling clock (166). In all cases the purpose of the equalizer 24, 28, 29 is to provide output signals that are filtered in a time domain to a close approximation of a selected target waveform. The equalized sampled signal is then output on signal path 30. The samples are subsequently used to reconstruct the data stored on the disc 14 using, for example, conventional Viterbi detection techniques.

As has already been mentioned, the peak-detection-based self-synchronization subsystem of the present invention shown, in general by numeral 11 on FIG. 1 utilizes a differentiated version of filtered readback signals. For that purpose, a diagram of FIG. 1 shows a conceptual switch 27, output of which provides such differentiated input signal to the subsystem 11 on signal path 62. Depending on construction of the equalizer, the input to the subsystem 11 can be taken either from the (inside of) equalizer itself (numeral 61', see also FIG. 2) or from the differentiated output of the continuous time prefilter 18 (numeral 61").

Figure 2:
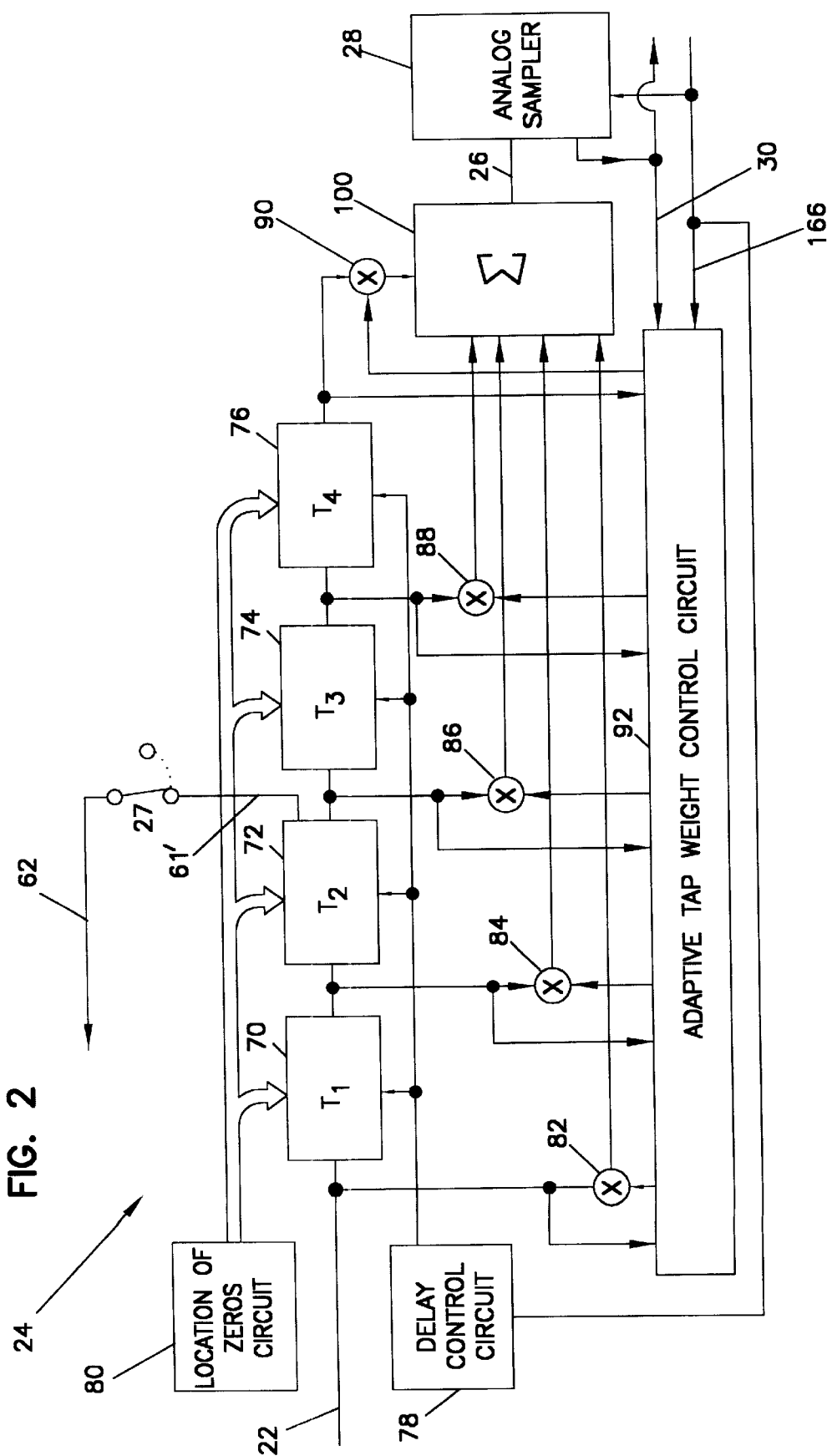
FIG. 2 is a functional block diagram of the time-domain equalizer of FIG. 1 for data recovery in the case of analog, continuous-time equalizer implementation.

As already mentioned, a variety of constructions for the time-domain equalizer can be utilized in accordance with the present invention, including equalizers employing decision feedback equalization (DFE). However, for purposes of disclosure, equalizer 24 will be discussed with reference to FIG. 2, which represents a double-domain equalizer. For a more detailed discussion of a double domain equalizer see U.S. Pat. No. 5,650,954 entitled "Frequency and Time Domain Adaptive Filtration In A Sampled Communication Channel," issued Jul. 22, 1997 to Minuhin (Minuhin '954). The term "double-domain" refers to the operation of the equalizer wherein both time-domain-and frequency-domain equalization occur in parallel. Particularly, FIG. 2 shows the equalizer 24 to comprise a plurality of serially connected active filter sections 70, 72, 74 and 76, each of which provides a one-bit delay in response to timing signals provided from a delay control circuit 78. The filtering characteristics of the filter sections 70,72,74 and 76 are further controlled by a location of zeros circuit 80. More particularly, the transfer functions for the filter sections 70,72,74 and 76 may be characterized as quotients having linear phase denominators and real numerators, given as follows:

$$T(s) = \frac{K_2 s^2 + K_0 a_0}{s^4 + a_3 s^3 + a_2 s^2 + a_1 s + a_0} \quad \text{(Eq. 1)}$$

or $$T(s) = \frac{K_2 s^2 + K_0 b_0}{s^5 + b_4 s^4 + b_3 s^3 + b_2 s^2 + b_1 s + b_0} \quad \text{(Eq. 2)}$$

with a's and b's being corresponding coefficients of fourth- or fifth-order linear phase equiripple (with 0.05 degree ripple) polynomials.

Thus, in controlling the constants $K_0$ and $K_2$, the location of zeros circuit 80 controls the location of zeros in the numerator of the transfer function of, and hence the magnitude-frequency response of, each of the filter sections 70, 72, 74 and 76; in like manner, the delay control circuit 78 controls the denominators of the transfer functions and hence the time delay response of, each of filter sections 70, 72, 74 and 76.

The equalizer 24 further includes analog multipliers 82, 84, 86 and 90 which multiply tap signals from associated tap locations between the filter sections 70, 72, 74 and 76 by tap weight signals provided by an adaptive tap weight control circuit 92. As discussed the Minuhin '954 patent, the adaptive tap weight control circuit 92 adaptively adjusts the tap weights during operation of the equalizer 24 in response to the tap signals, samples provided by the sampler 28 by way of signal path 30, and sampling clock signals provided from a timing delay circuit 96 (FIG. 1) by way of signal path 166. As shown in FIG. 2, the delay control circuit 78 also utilizes the signals from the signal path 166. Outputs of the analog multipliers 82, 84, 86, 88 and 90 are provided to an analog summer circuit 100 which provides equalized output signal on signal path 26 to the analog sampler 28 which is controlled by the sampling clock on signal path 166.

Figure 3:
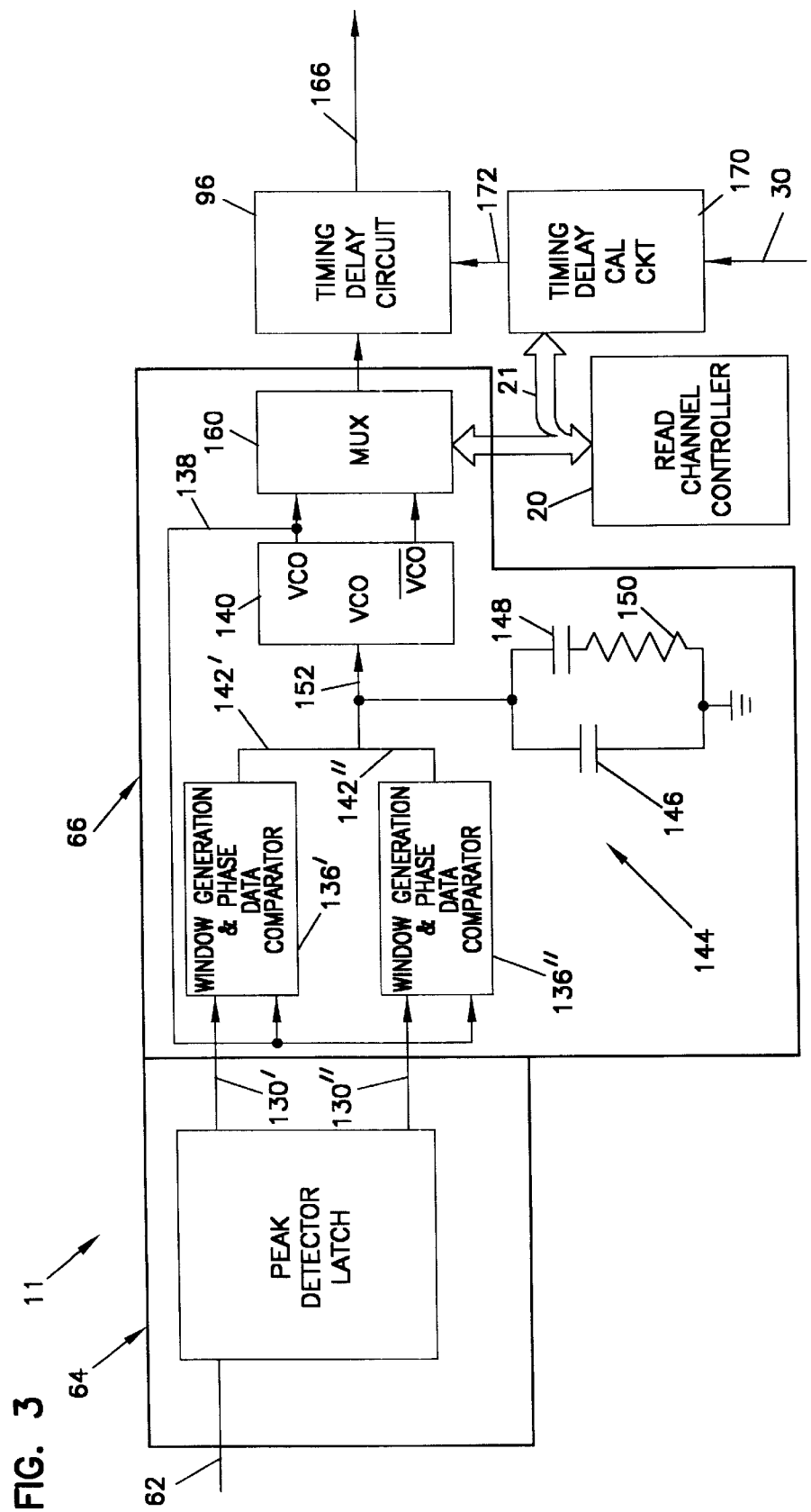
FIG. 3 is a functional block diagram of the self-synchronization subsystem of FIG. 1 without a post-processing feature.

Having concluded a discussion of the equalization performed by the channel 10 of FIG. 1, attention will now be directed again to the self-synchronization subsystem 11 of FIG. 1 and FIG. 3, where subsystem 11 is shown in more details.

As already mentioned above and will be explained in more details hereinbelow, the input to the self-synchronization subsystem 11 is a filtered and differentiated readback signal. As shown on FIG. 1, it is possible to form a filtering and differentiating channel to provide the input to the self-synchronization subsystem 11 directly from the prefilter 18. However, for the purpose of this disclosure, to keep it self-contained, it is assumed that the subsystem 11 receives its input signal on signal path 62 (through the conceptual switch 27), from the middle of the equalizer 24 (of FIG. 2) used for data recovery.

The filter section 72 (FIG. 2) which provides signal to the main (middle) tap of the equalizer is slightly different from the other sections 70, 74, 76. The other sections can comprise filters of either 4-th order (Eq. 1)) or 5-th order (Eq. 2). The section 72, however, must comprise a filter of an odd order (Eq. 2), because it must provide the differentiated version of the main tap signal (the ideally differentiated version of a filtered signal can be obtained, without a special differentiator, in filters of odd order only) of the equalizer to the self-synchronization circuit 11 of FIG. 1. This differentiated output is shown on FIG. 2 as numeral 61'; it is connected by a signal path 62 (through the conceptual switch 27) to the self-synchronization subsystem 11 of FIG. 3 (and FIG. 1), particularly, to the peak detector latch 64.

The principle of operation of peak detector latch 64 requires an explanation, because it is not a conventional peak detector circuit. The architecture of the peak detector latch 64 reflects adaptation to particular features of readback signals at very high density recording, at which a conventional peak detection technique will not work. The characters of these signals are illustrated in FIGS. 4, 5, and 6.

Figure 4:
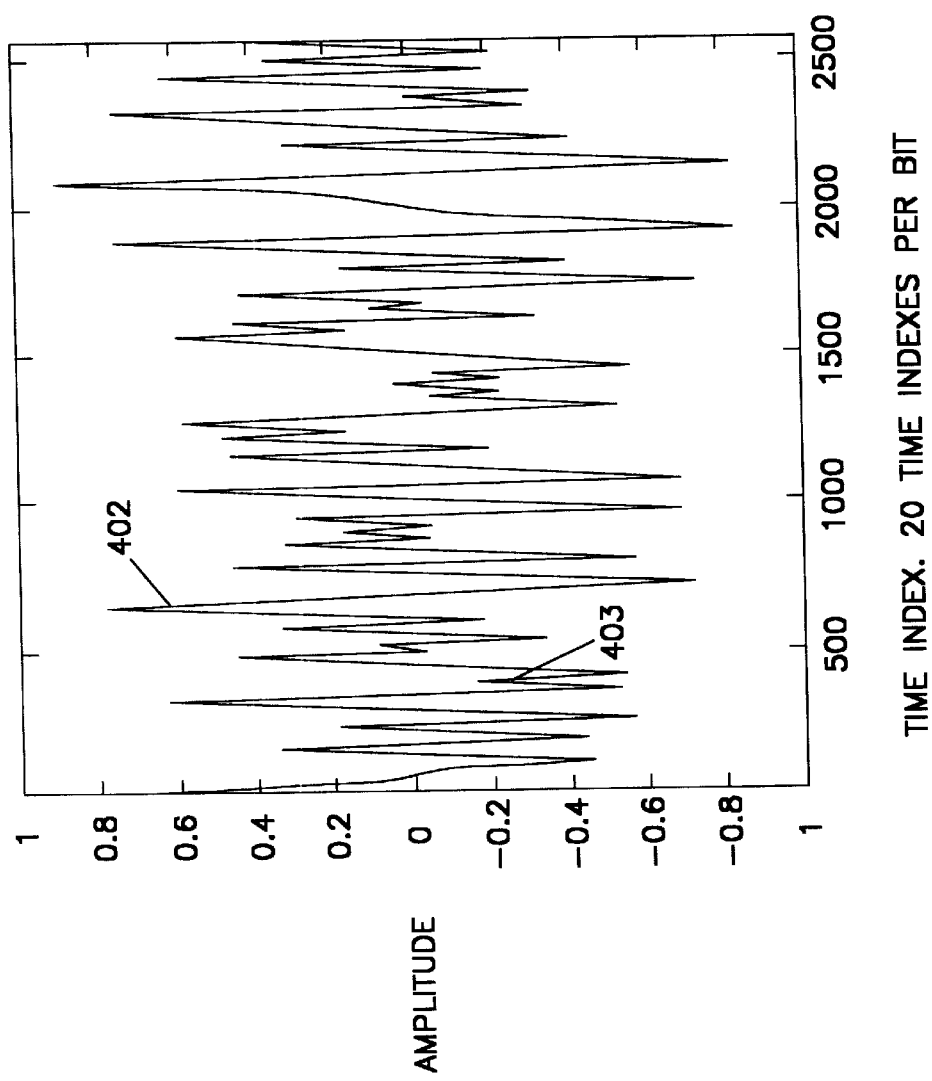
FIGS. 4, 5 and 6 provide graphical representation of a simulated noise-free input readback signal, of a resulting main tap signal from the time-domain equalizer of FIG. 2 and of the resulting differentiated main tap signal.
Figure 5:
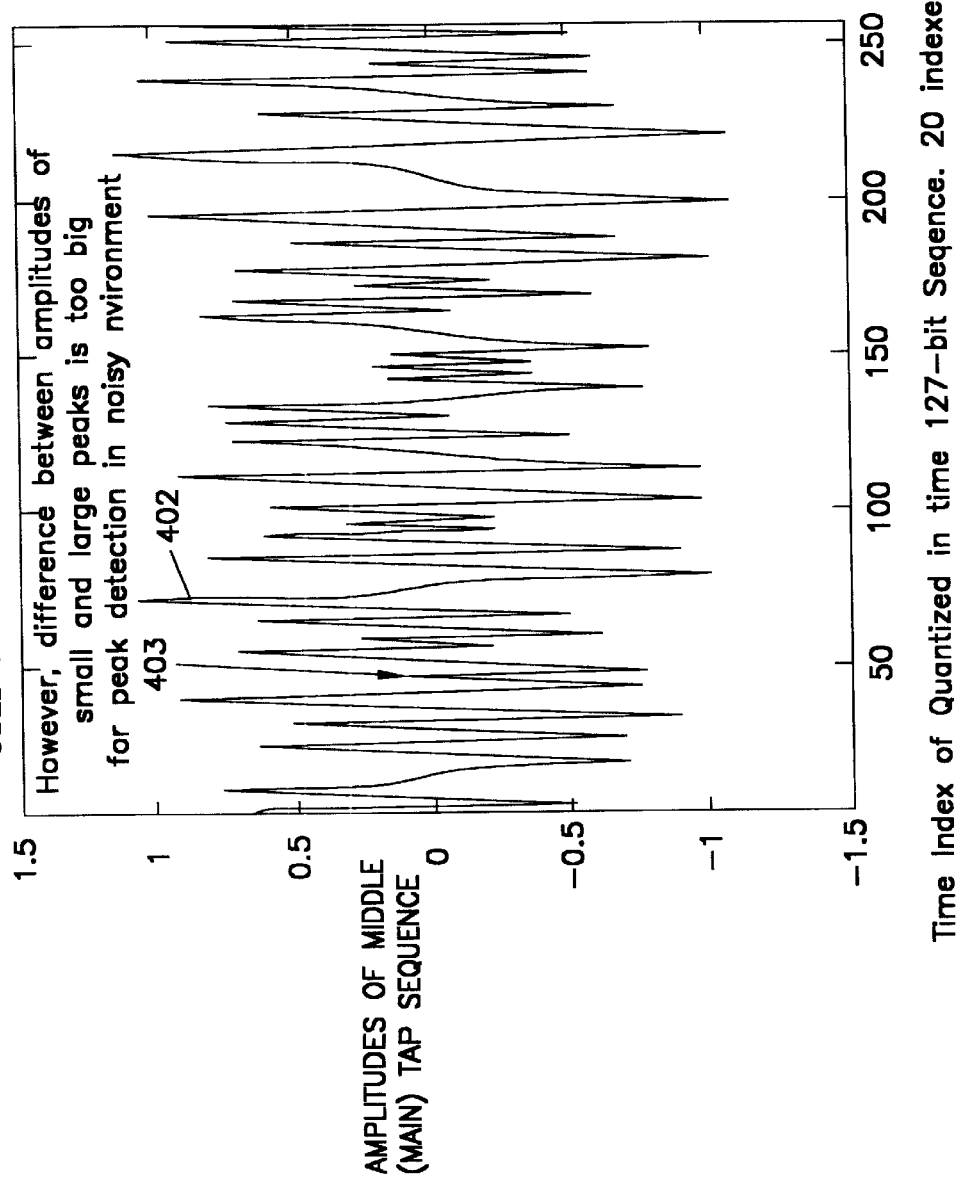
Figure 6:
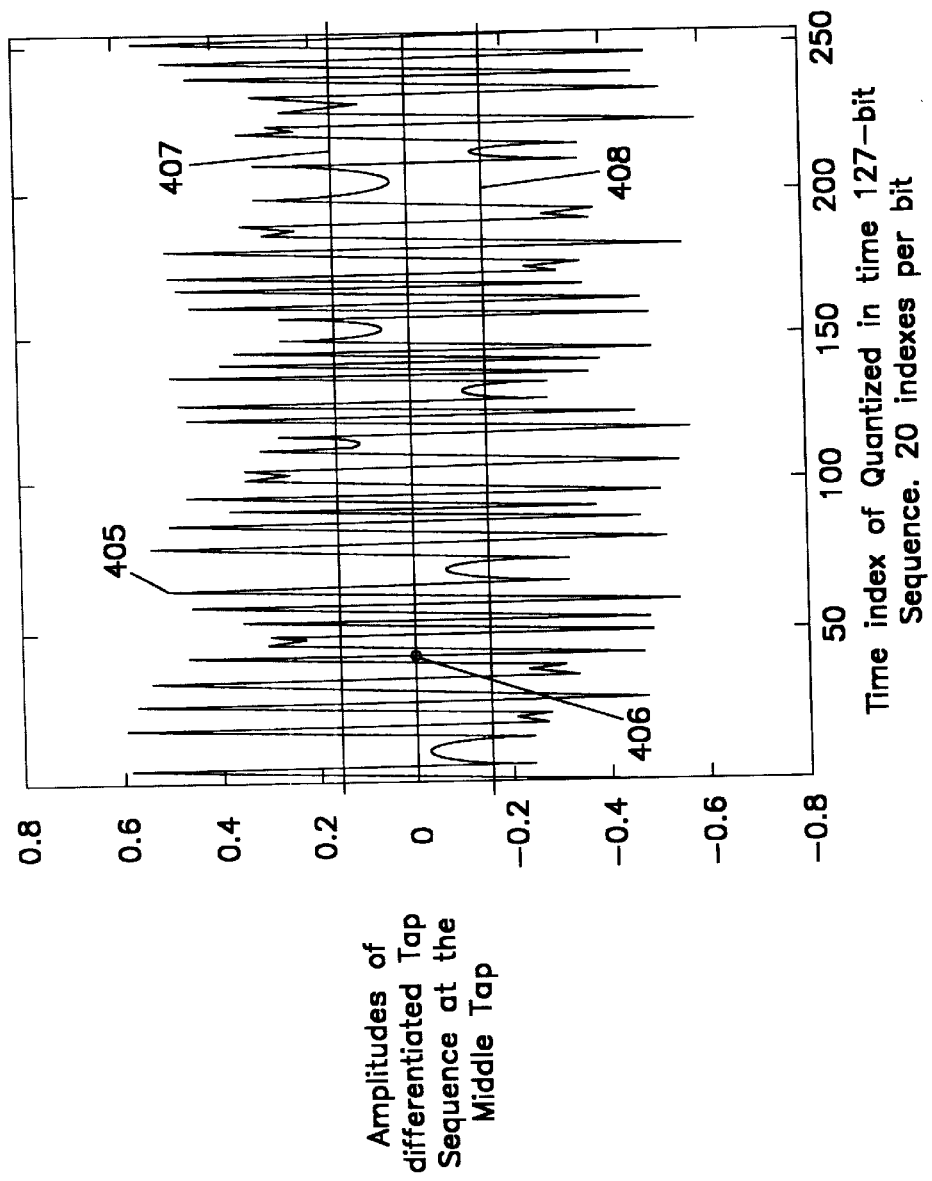

Referring now to FIGS. 4, 5, and 6, shown therein as numeral 402 is the graphical representation of a noise-free periodic and amplified read signal on lead 17 (FIG. 1) from a magnetic head 12. The signal 402 is a simulated readback response to a 127-bit, periodic, pseudo-random sequence of maximum length written on the disc drive media. The particular binary sequence employed is a useful tool in checking experimentally the performance of magnetic recording channels, as the resulting read signal 402 contains all frequency components of interest (see F. J. MacWilliams and N. J. A. Sloane, "Pseudo-Random Sequences and Arrays", IEEE Proceedings, vol 64, No. 12, Dec. 1976, pp. 1715–1729). The read signal 402 is plotted against a horizontal axis indicative of time and vertical axis indicative of the signal amplitude (in volts). As demarcated, the horizontal time axis comprised 20 time indexes per bit (indicative of 20 times oversampling used in computer simulation). The transition (in magnetization) response of the readback head is assumed to be represented by the Lorentzian (bell-shaped) pulse which is usually used in the modeling of recording channels. The Lorentzian pulse is described by the formula $$Y(t) = \frac{A}{1 + \left(\frac{2t}{PW_{50}}\right)^2},\qquad \text{(Eq. 3)}$$

where t is the time, A is the pulse amplitude (A=1 at FIG. 4) and $PW_{50}$ is the pulse width parameter (width of the pulse at 50% of its amplitude). For simulated in FIG. 4 high density recording, it is assumed that $PW_{50}$=2.7.

As shown on FIG. 4, the simulated raw readback signal 402 is severely depleted in its high frequency content, its resolution is very poor and some signal peaks (see numeral 403, for example) are even below zero level. Unfiltered signal 402 is, therefore, totally unsuited for a conventional peak detection.

FIG. 5 illustrates the corresponding filtered signal 402 at the main tap of the equalizer (FIG. 2) at the signal path 63. As a result of filtering, signal resolution has been improved, but peak 403 is still hardly exceeds a zero level. The achieved filtering is, therefore, appropriate for the data recovery (more filtration will be done in the double-domain equalizer itself), but it is still unsuitable for a reliable conventional peak detection in a noisy environment.

Finally, FIG. 6 illustrates the differentiated copy 405 of the filtered signal at the differentiated output 61' of the main tap section 72 (FIG. 2). That signal is supplied at signal lead 62 to the peak detector latch 64. It should be noted that the small peak 403 of FIG. 5 corresponds now to a very reliable (in noisy environment) zero-crossing 406. In other words, the differentiation improved dramatically the signal resolution for peak detection, provided that peak detection is not dependent on thresholds for nondifferentiated signal, but instead utilizes thresholds for differentiated signals. Such suitable threshold levels for differentiated signals are shown on FIG. 6 by numerals 407,408.

Figure 7:
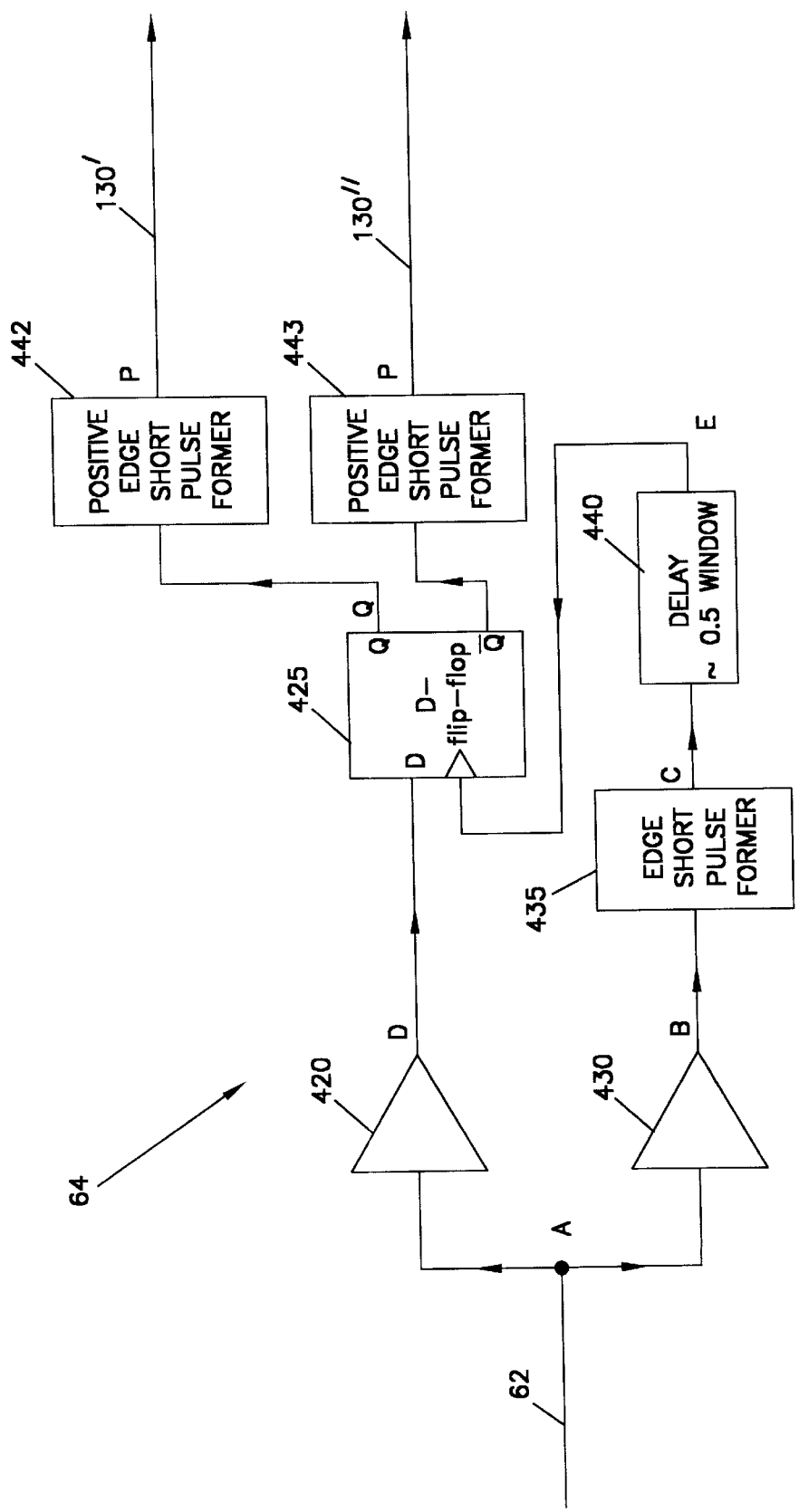
FIG. 7 is a functional block diagram for the peak-detecting latch which is based on processing of only differentiated signals.

Now returning to the principle of operation of peak detector latch 64, a block diagram of the peak detector latch 64 is shown on FIG. 7 with letters identifying signals at specific points. Timing diagrams of signals at these lettered points are given on FIG. 8.

Figure 8:
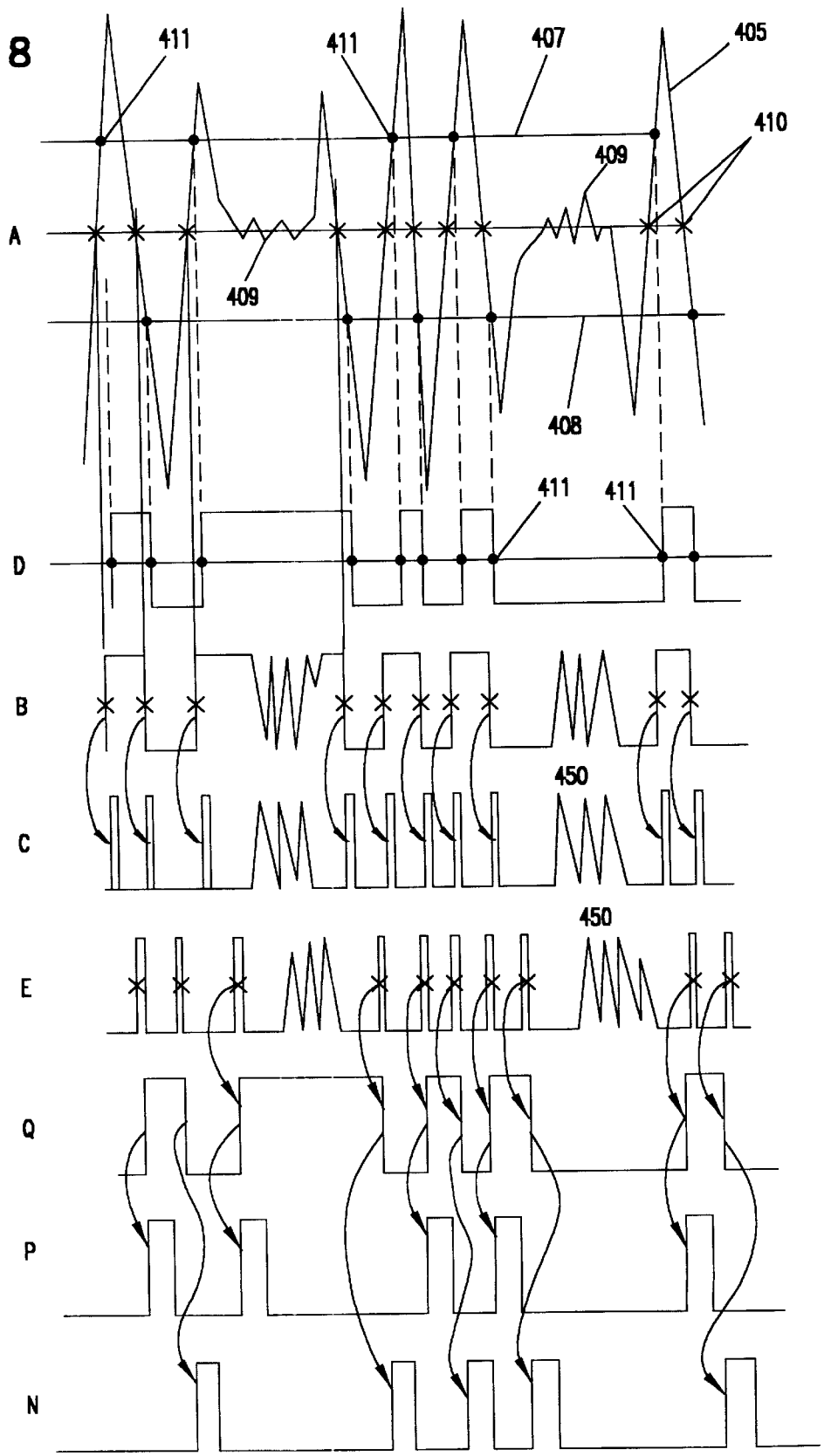
FIG. 8 provides time diagrams illustrating operations of the latch shown on FIG. 7.

Input signal to the latch 64 at lead 62 is shown at FIG. 7–8 as a graph A. It basically corresponds to signal 405 of FIG. 6, but with (conceptual) addition of some noise 409. The purpose of the latch 64 is to latch on valid zero-crossings (of differentiated signal 405 ), and to ignore nonvalid zero-crossings 409 caused by noise (valid zero-crossings are depicted by fat x's 410 on FIG. 8). Fat dots 411 indicate time moments when input signal 405 crosses threshold levels of a hysteresis comparator 420 and causes comparator to change its state. Output of the hysteresis comparator is shown at graph D and is supplied to D-input of a D-Flip-flop 425. A zero-threshold comparator 430 that changes its state from every zero-crossing of input signal 405 (including noise-caused zerocrossings) works in parallel to the hysteresis comparator 420. Output of the zero-threshold comparator 430 (graph B) is provided to an edge-short-pulse-former 435 which produces short pulses from each transition at point B (Graph C). Pulses at point C are delayed by a delay circuit 440 (roughly by 0.5 of clock period, see graph E) and arrive at the clock input of the flip-flop 425 shortly after the hysteresis comparator caused valid change of D-signal at D-input of the Flip-flop 425. Only first short pulse, which is caused by the valid zero-crossing in the input signal 405 will effect the state of the Flip-flop 425 (graph Q). False zero-crossings 409 will not affect Flip-flop 425, because despite false pulses at the flip-flop's clock input, there will be no change at its D-input until the next change of the state of the hysteresis comparator 420. A final stage of the peak detector latch 64 are the two positive edge short pulse formers 442,443 which are connected to two complimentary outputs of the flip-flop 425. They provide validated readback pulses for positive and negative transitions in media magnetization correspondingly (graphs P and N on FIG. 8) that are supplied at signals paths 130' and 130" to two parallel window-generation & phase comparator circuits 136' and 136" of the phase locked loop 66, FIG. 3.

It should be obvious from the description above and graphics, that each valid zero-crossing in input signal to the latch 64 causes first the change of the state of the zero-crossing comparator 430 and then the change of the state of the hysteresis comparator 420. But delay element 440 reverses situation at the inputs of the flip-flop 425. As a result, spurious vacillations in hardware of peak detector latch 64 (shown as numerals 450 at FIG. 8) are not seen at its output.

Having concluded a discussion of the operation of the peak detection latch, attention will now be directed to the PLL subsystem 66 of the present invention shown on FIG. 3. This subsystem 66 includes two parallel window-generator and phase-data-comparators 136' and 136", a common PLL filter 144, a voltage-controlled oscillator 140 and a multiplexer 160. The necessity to have two parallel blocks 136 is the consequence of the fact that the phase comparators used in peak detection channels require two clock cycles to perform one cycle of phase comparison. This is because it is also necessary to perform a "Window Generation" process that requires an addition cycle. Therefore, phase comparators of a peak detection circuitry as found in the prior art actually work only with the codes that have at least one zero between ones. But the present invention anticipates the use of modulation codes for a high density recording without any constrain on number of zeros between ones. For that reason it is necessary to do window generation and peak detection separately for positive and negative peak pulses.

Figure 9:
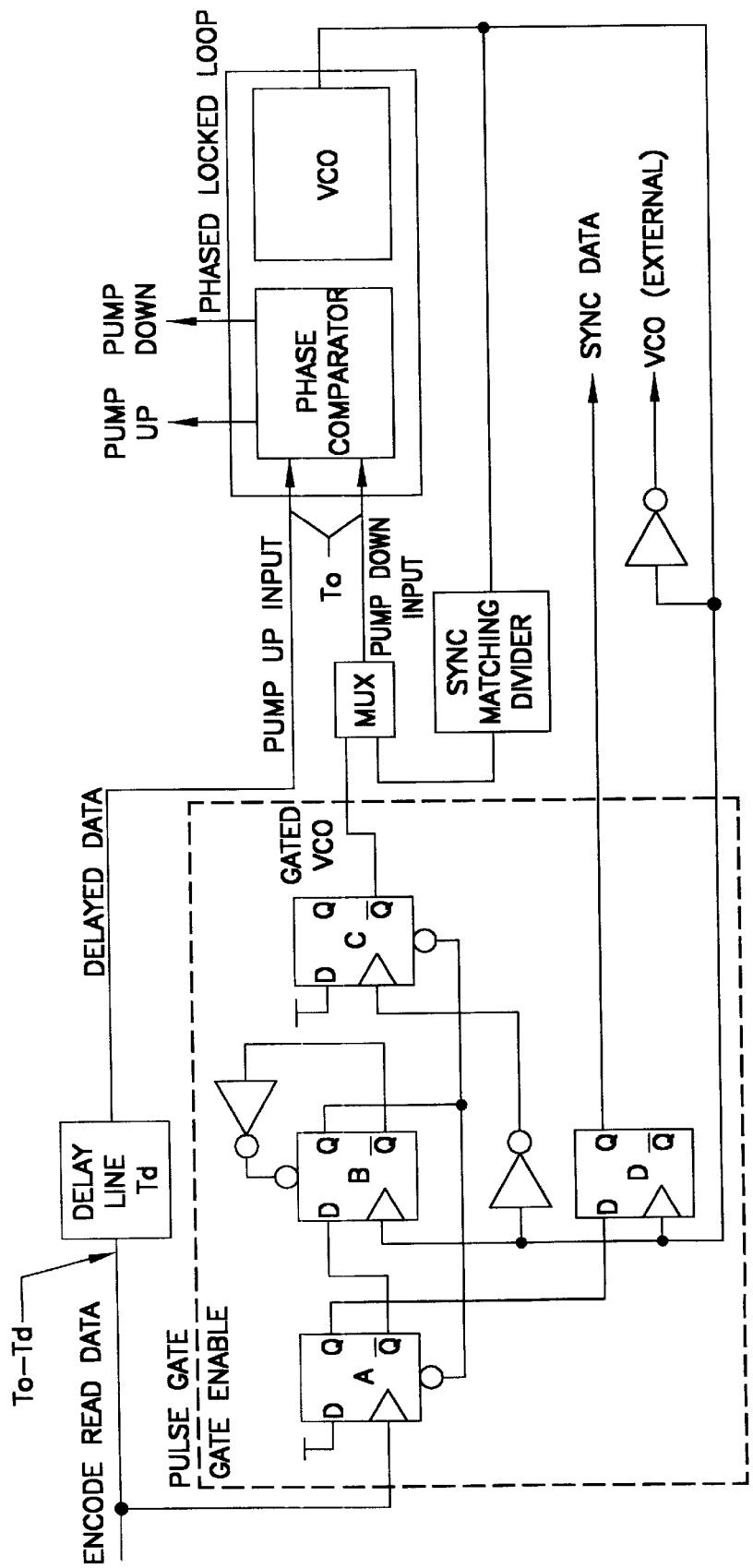
FIG. 9 illustrates a circuit for window generation in prior art peak-detection-based data recovery.
Figure 10:
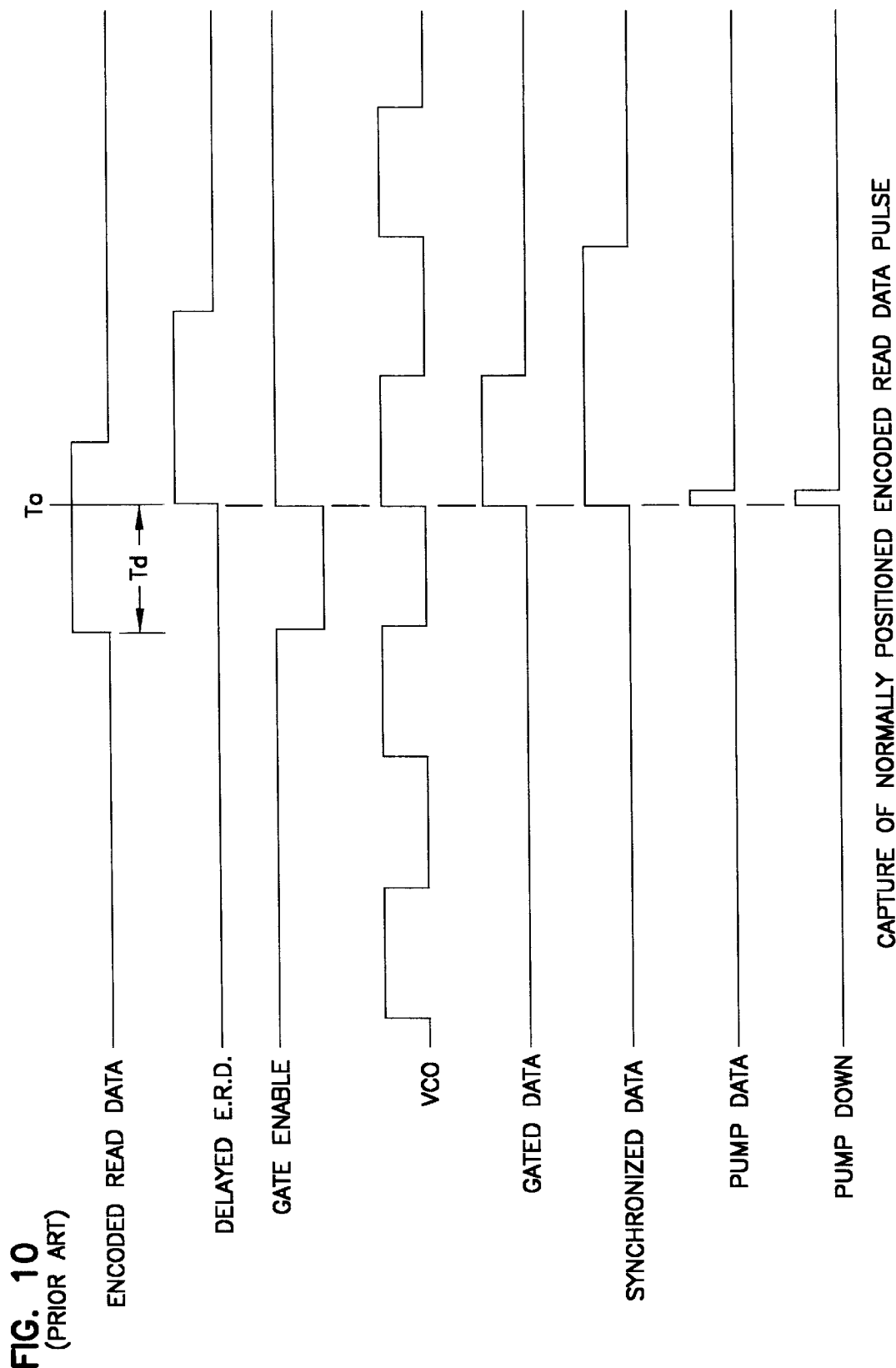
FIG. 10 illustrates a timing diagram for the prior art window generation circuit shown in FIG. 9.

FIGS. 9 and 10, from National Semiconductor Advanced Peripherals Mass Storage Handbook (1988 edition, page 4–38) illustrate a process of window generation in the prior art peak-detection-based data recovery system. This window generation procedure is necessary for adapting a coincidence-type phase comparator ("phase comparator" on FIG. 9; descriptor coincidence-type refers to the fact, that in absence of phase error, rising edges of two compared in phases signals at comparator inputs coincide in time, see timing diagram on FIG. 12) employed (that normally operates with strictly periodic input signals) to phase comparison of randomly occurring recovered readback pulses. In other words, a coincidence-type phase-data comparator used needs "advanced warning" (provided by delay line $T_d$ on FIG. 9 and circuit in a large dashed rectangle on FIG. 9) that the readback peak pulse is coming. The internal structure of the coincidence-type phase-data comparator is not shown on FIG. 9. It is shown on FIG. 11.

Figure 11:
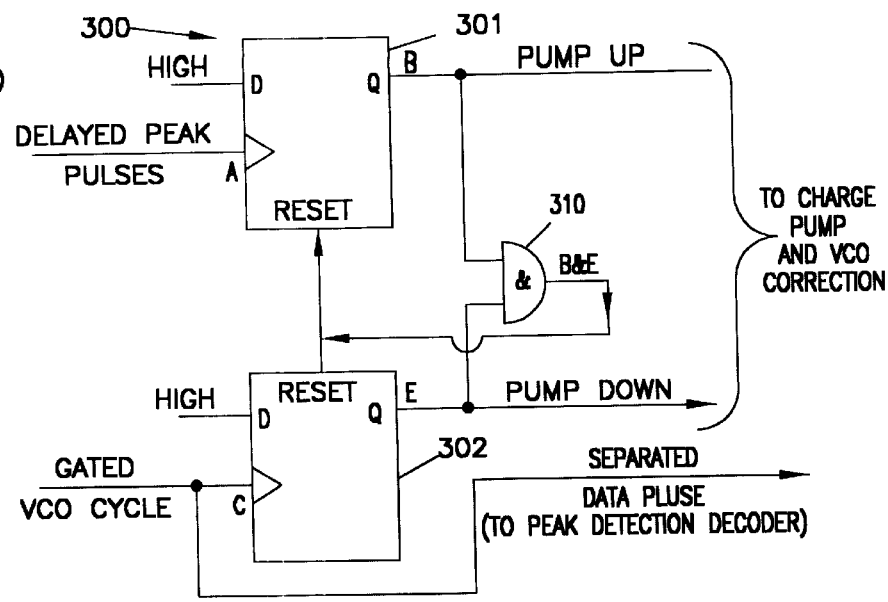
FIG. 11 is a detailed block diagram of prior art coincidence comparator of FIG. 9 used as a phase comparator for randomly occurring readback pulses.
Figure 12:
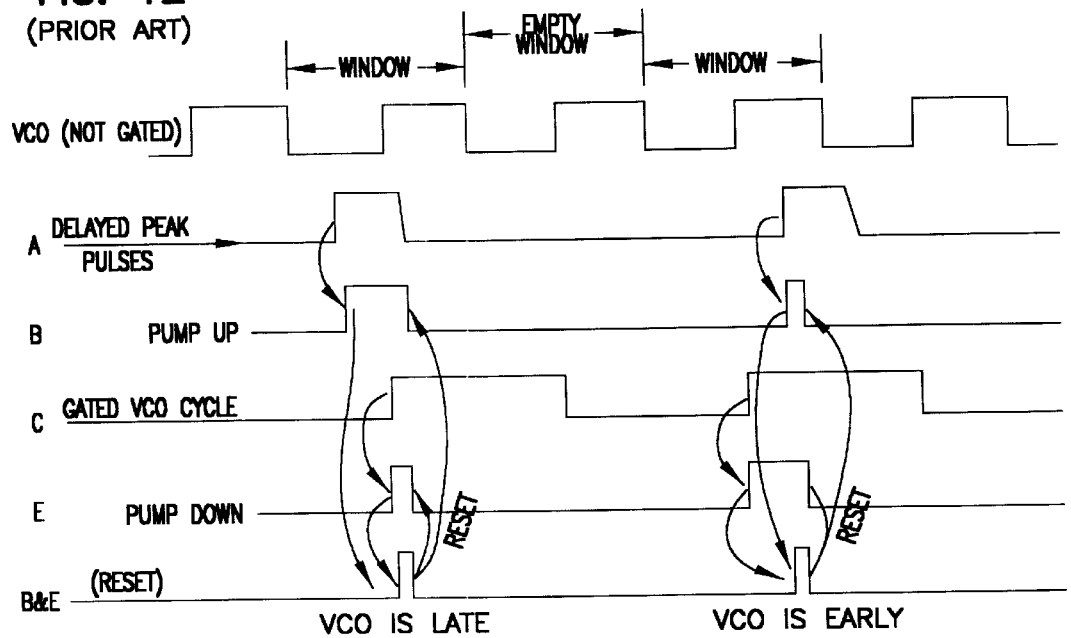
FIG. 12 shows timing diagrams that illustrate operations of the coincidence comparator shown in FIG. 11.

FIG. 11 is the block diagram of a coincidence-type phase-data comparator 300 for the peak detection; the timing diagram of its operation is presented on FIG. 12. Comparator 300 utilizes signals generated by the window-generation circuitry of FIG. 9. Also, a theoretical transfer function of the phase-data comparator 300 is shown on FIG. 13. Phase comparator 300 consists of two D-flip-flops 301 and 302 with a high logical level at their D-inputs and an AND gate 310 connected to their Q-outputs, output of AND gate connected to asynchronous overriding reset inputs of both flip-flops. Phase comparator 300 also includes an analog charge pump that generates current pulses into the loop filter 144 (FIG. 3) that are proportional to pump up and pump down signals generated by logical circuit of phase comparator 300. These current pulses charge (pump up) or discharge (pump down) capacitors of the loop filter 144, and by doing so provide correction of the frequency of the VCO 140 (FIG. 3). The details of the charge pump are not shown on FIG. 11.

Basically, the phase comparator 300 is a simple sequential logic circuit that has an unstable state when both flip-flops 301 and 302 are in a state 1 (Q-s outputs are both high). If this happens, the gate 310 immediately resets asynchronously both flip-flops to a state 0. The cycle of phase comparison in the phase comparator 300 starts from rising edge of signal at either clock input of flop-flops 301 or 302. The cycle finishes with rising edge at the input of the other flip-flop when AND gate 310 resets both flip-flops to 0-state. The outputs of both flip-flops, therefore, create pump up and pump down pulses of constant amplitude that are proportional in width to a phase error between input pulses and the VCO clock. Thus, pump pulses together with integrating action of the loop filter 144 (FIG. 3) control and correct frequency of the VCO that provides a sampling clock for the channel. Timing diagrams on FIG. 12 provide detail explanation of the operation of the phase comparator 300.

Figure 13:
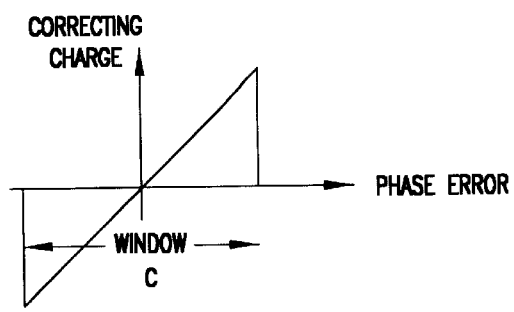
FIG. 13 shows a transfer function for the coincidence comparator shown in FIG. 11.

The theoretical transfer function (correcting charge versus phase error) of the phase comparator 300 is shown on FIG. 13. Note that if actual peak shift exceeds window range, this results in an error in data detection (shifted bit) in a conventional peak detection channel and in a strong miscorrection of the VCO. Because the preferred embodiment of the present invention does not use clock channel for data detection, miscorrection of the VCO is the only concern.

As shown on FIG. 3, the PLL subsystem 66 in practice utilizes two parallel circuits 136' and 136", outputs of which 142' and 142" converge to a second order loop filter 144, comprising a capacitor 146 in parallel with a capacitor 148 in series with resistor 150. The VCO 140 generates two complimentary clock signals denoted VCO and NOTVCO with the NOTVCO signal 180 degrees out of phase with the VCO signal. As will be recognized, selected types of equalization, such as classes PR-4 and EPR-4 employ such complimentary clock signals. Thus, both the as VCO and NOTVCO are provided to a multiplexer ("mux") 160, which is selectively controlled by the read controller 20 as shown (by way of control bus 21).

The selected signal (VCO or NOTVCO) is provided by the mux 160 to the programmable timing delay circuit 96, which provides fine delay control of the selected signal (VCO or NOTVCO) from the VCO 140. Particularly, the timing delay circuit 96 includes a programmable delay which facilitates fine adjustment in the phase of the channel clock, which is output by the timing delay circuit 96 on signal, path 166 to the sampler 28 (of FIG. 2) as well as to the Viterbi detection circuitry and decoder (not shown) to reconstruct the retrieved data from samples of the equalized signal.

The programmable delay used by the timing delay circuit 96 is set and controlled by the timing delay calibration circuit 170 during the receipt of the sector preamble signals. More particularly, as will be recognized, a special "synchropattern" is customarily written before each sector of data stored on the disc 14. The reading of the synchropattern by the head 12 results in the generation of the sector preamble signals, which comprise, for example, sinusoidal signals used by the channel 10 to lock VCO 140 in the correct phase and to prepare it for the recovery of the data stored in the sector.

During receipt of the sector preamble signals, the read channel controller 20 issues (among other commands on bus 21) two specific commands to calibrate the self-synchronization circuit 11. The first command which is provided to the timing delay calibration circuit 170 enables the process of calibration of the timing delay circuit 96; simultaneously, the second command which is provided to the time-domain equalizer 24, 28, 29 freezes the process of adaptation of tap coefficients in the time-domain. Thus, the process of calibration of the subsystem of self-synchronization 11 and the process of equalization do not interfere with each other. The timing delay calibration circuit 170 will (in response to the samples on signal path 30 from the sampler) perform a fine adjustment of the amount of delay used by the timing delay circuit 96 (by way of new delay values provided on signal path 172) until the equalized samples obtain predetermined nominal values (for the preamble). Thereafter, the sector data will be processed using calibrated delay until next preamble is encountered Having concluded a general discussion of the self-synchronization subsystem of the present invention shown on FIG. 1, additional simulation results will now be presented. As has already been mentioned, FIG. 4 illustrates a simulated noise-free raw readback signal (obtained by superposition of Lorentzian pulses (3)) in the described above simulated magnetic recording channel. To simulate the operation of self-synchronization subsystem in noisy environment, a white Gaussian noise of RMS (root-mean square) value 50 mv (in the effective channel passband) has been added to the signal shown on FIG. 4. Therefore, an input S/N (signal/noise) ratio defined with respect to amplitude of isolated readback pulse (3) becomes 26 decibels (db).

Figure 14:
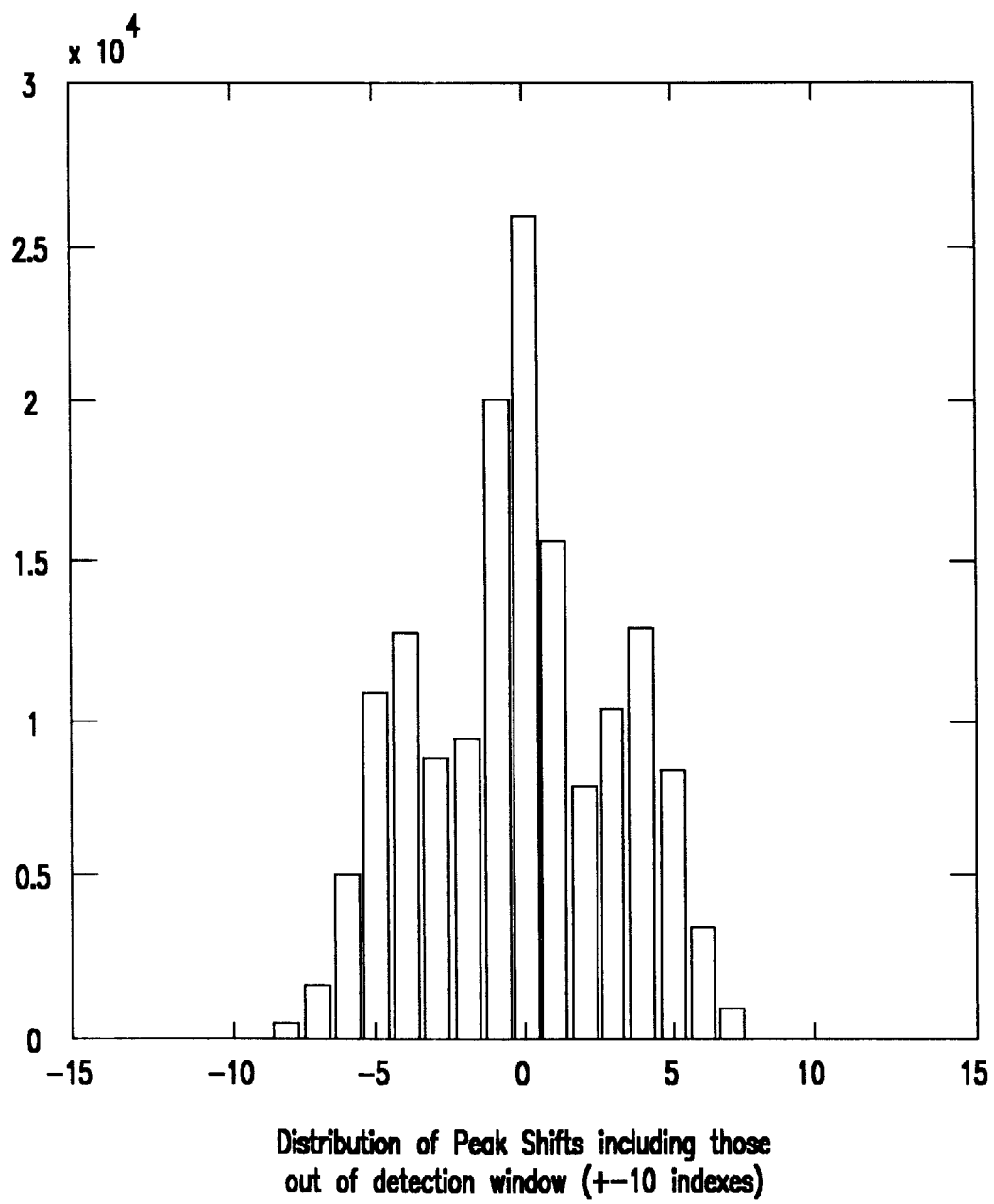
FIGS. 14 and 15 provide graphics of some simulation results for the operations of the self-synchronization circuit (without post-processing feature) shown on FIG. 3.

FIG. 14 illustrates obtained simulation results for sequence of 304800 bits transferred. More particularly, FIG. 14 shows histogram of resulting peak shifts when noisy-free differentiated signal of FIG. 5 plus filtered input noise (not shown) was used as an input to the peak detector latch 64

Figure 15:
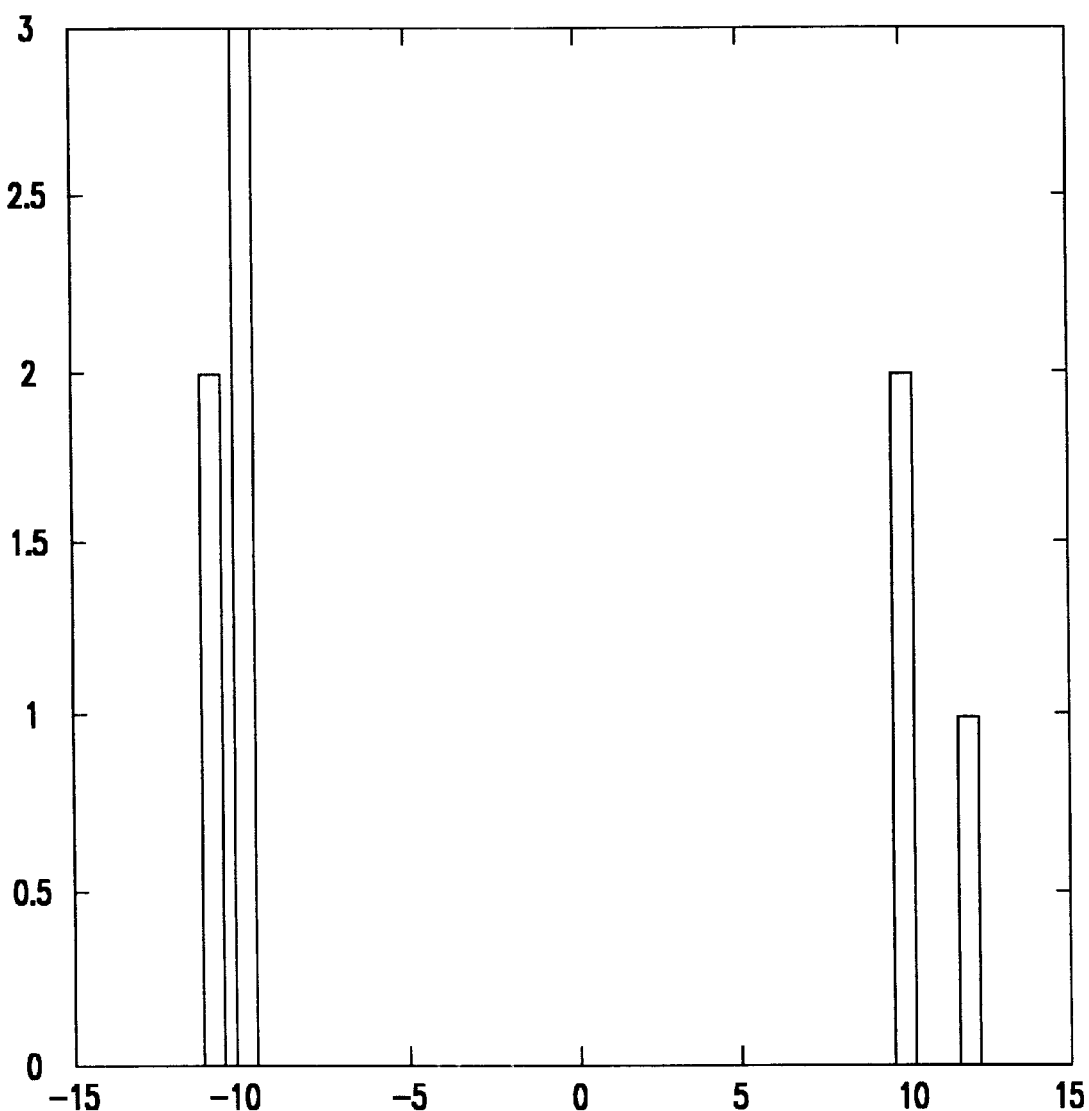

(FIG. 1–3) (Note: for noise-free input signal, the maximal spread of the histogram due to ISI would be only ±4 indexes). When a nominal detection window used is ±10 indexes (oversampling 20), all peak shifts that are less than 10 indexes in absolute values should be considered as correctly detected peaks positions, which are used for appropriate corrections of the VCO. To be on a safe side, peak shifts of values ±10 indexes should be considered as errors, which results in miscorrections of the VCO. The instances of miscorrection are not noticeable on FIG. 14. So, they are presented separately in FIG. 15. All these miscorrection events were isolated errors. The 304800 bits of pseudo-random sequence transferred corresponded to 153600 physical peaks (adjacent bits of the same values do not result in peaks). As evident from FIG. 15, out of these 153600 peaks only 8 peak-shifts "out of window" occurred. Therefore, error rate obtained in this experiment was $\sim 5*10^{-5}$ (the experiment also resulted in 4 missing peaks (no correction), but no extra peaks).

Taking into consideration that a single rare event of "miscorrecting" pulse into loop filter will be integrated in the filter together with many appropriate correcting pulses, obtained above error rate in clock recovery should be considered as very good and sufficient for appropriate data recovery, except when S/N ratio in the channel is actually extremely poor.

An alternative second preferred embodiment of the present invention is appropriate in the case when S/N ratio in the magnetic recording channel is not sufficient for the first embodiment. The second embodiment utilizes potential "dormant" resources of a coincidence-type phase data comparator shown in FIG. 11 and an idea of a post-processing in a clock recovery.

Figure 16:
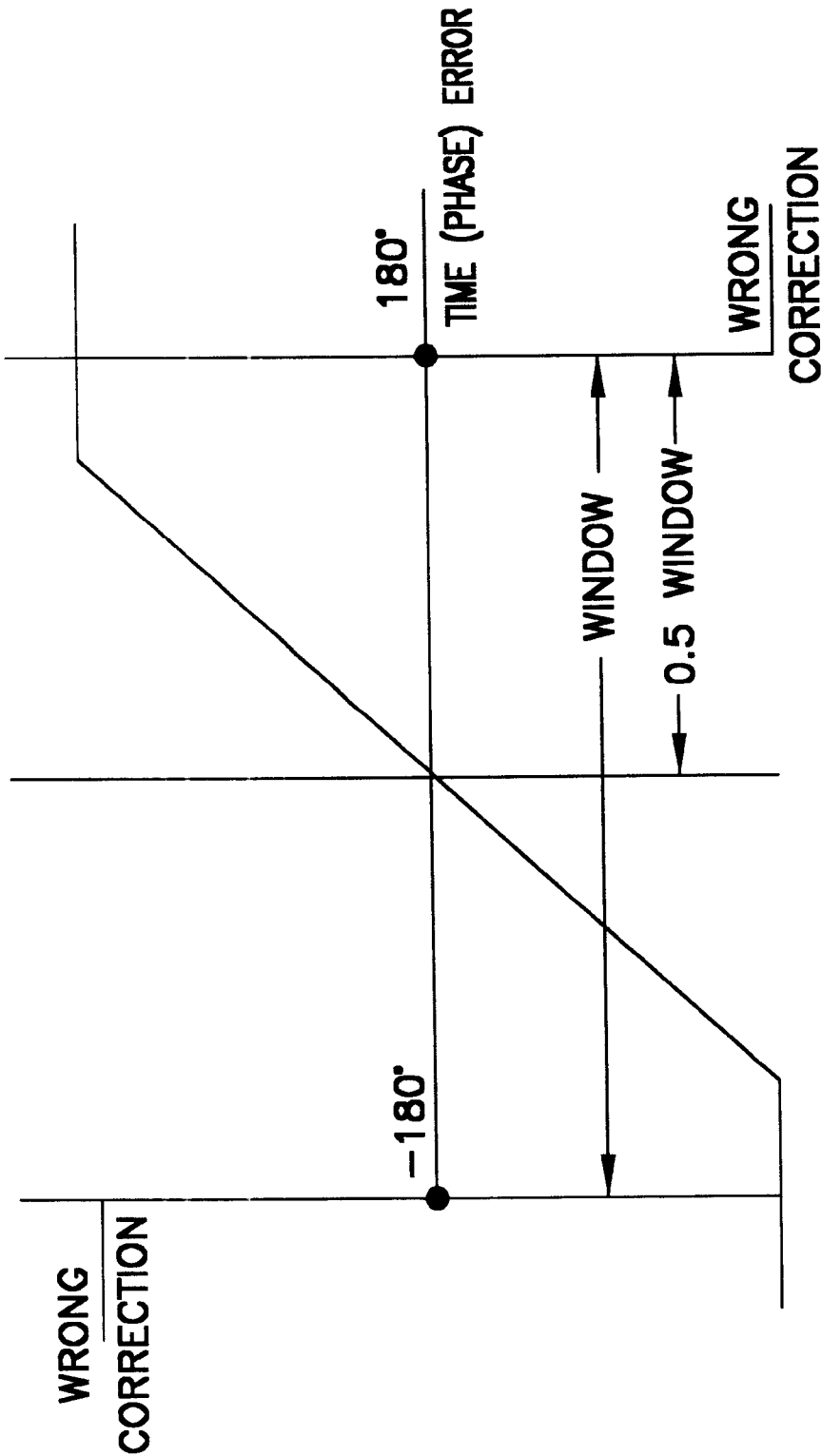
FIG. 16 illustrates a desirable transfer function of the phase comparator for the realization of robust post-processing in a clock recovery based on peak detection

FIG. 16 illustrates a desired transfer function of data-phase comparator modified in accordance with the present invention to utilize said "dormant resources". The basic idea behind proposed modification is as follows: data-phase comparator of the previous art shown on FIG. 11 was designed for peak detection channels. In these channels it performed two functions: phase comparison and data separation (see "synchronized data" on FIG. 9). But in the present invention data separation is performed in the separate parallel data recovery channel. Therefore, requirements to phase-data comparator performance in a clock-channel-only are different. First, it is not necessary to strive to realize a full theoretical detection window. Furthermore, when the comparator with the transfer function presented on FIG. 13 is utilized in the first embodiment of the present invention and works close to the edge of its theoretical window, it works in a "suspicious" zone. There are two kind of "suspicion". The single readback peak pulse that is close to the boundary of the window may result not from the large timing error, but from a large local disturbance caused by some extreme ISI pattern or by extreme noise spike (or both). Indeed, if it were from a large time error, this would be accompanied by errors in the data channel and attempts to correct VCO would be futile. It is necessary, therefore to ignore such suspicious pulse and not to utilize it for the VCO correction. The second "suspicion" is that the local disturbance may be actually so large that the suspicious pulse may be actually shifted into the adjacent window. In this case, utilizing it for VCO correction would result in a very strong miscorrection. The second "argument" for the modification of transfer function is that a prior art comparator of FIG. 11 actually creates a lot of information about the channel state and, in particular, about local disturbances in it, that is not utilized at the present time. This information can be utilized advantageously, stored, decoded in a post-processing and used to correct clock recovery errors.

Thus, a transfer function of modified comparator as shown on FIG. 16 is not a simple ramp as on FIG. 13, but a ramp with "saturation" (flat ends) close to both window boundaries. With such transfer function, the peak pulses that are close to window boundaries will create correcting pump up or pump down pulses of known duration (charge) and polarity (a simple memory will remember polarity, see below). Then, the post-processing circuitry can make decisions how to use this information. In the simplest case, the post-processing circuitry can inject compensating current pulses (charges) into the loop filter 144 (FIG. 3 and 18) to compensate effect of suspicious peak pulses. For example, if the flat regions of the transfer function of FIG. 16 are set to 20% of the theoretical window, there would be no errors in a clock recovery simulation described in the first preferred embodiment.

Figure 17:
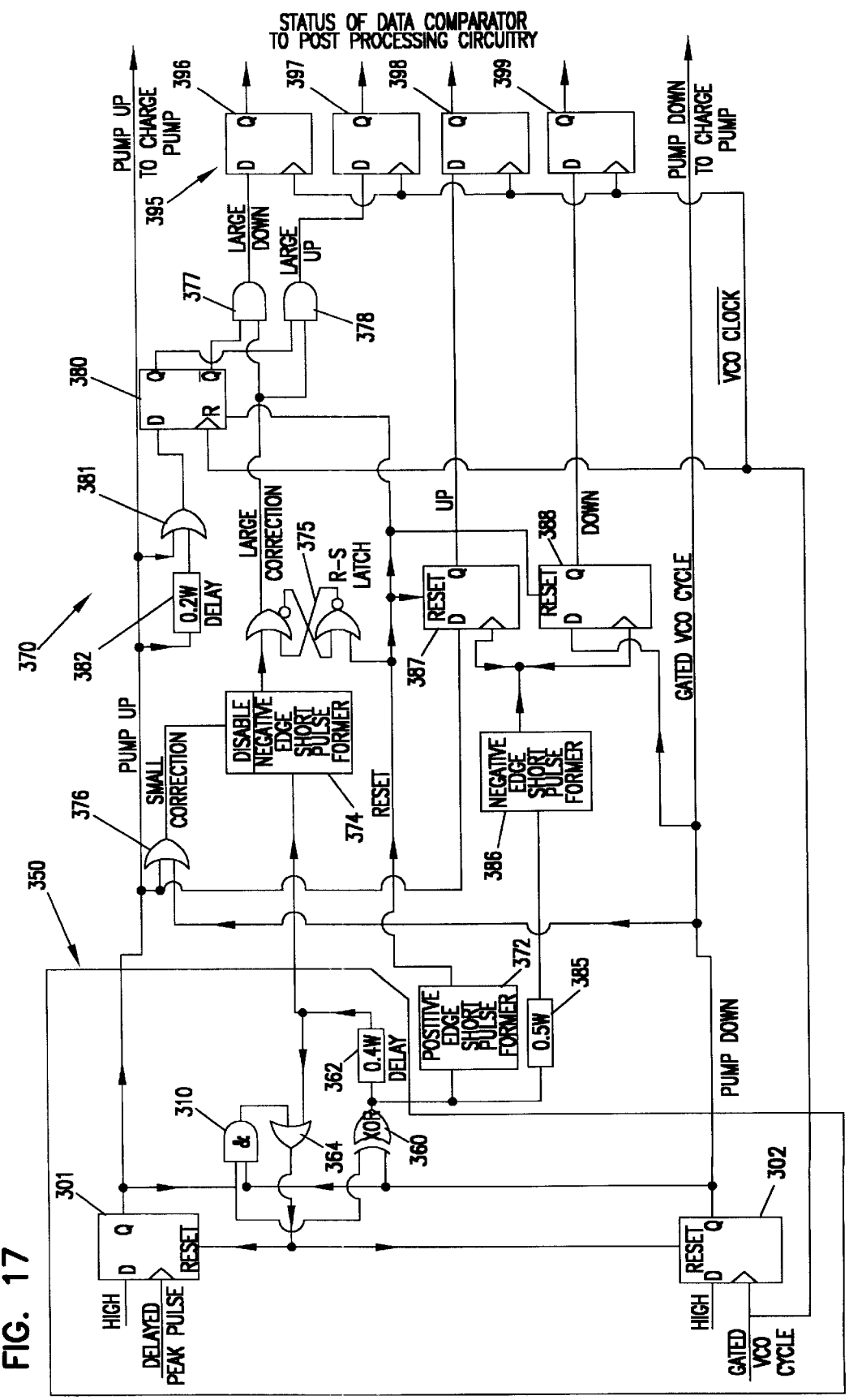
FIG. 17 illustrates the modification of the coincidence comparator of FIG. 11 and an additional hardware that provides the desired (for post-processing) transfer function shown on FIG. 16.

FIG. 17 is the block diagram of the phase-data comparator modified according to the present invention for its second embodiment. The modified phase-data comparator comprises of two distinctive circuits: The phase-data comparator proper 350, a status generation (circuitry) means 370 and status registers 395. The phase-data comparator proper 350 (inside of dashed contour) utilizes the same basic blocks 301, 302 and 310 as the comparator 300 (FIG. 11). However, an additional circuitry is also employed. Namely, both Q-outputs of flip-flops 301,302 are additionally connected to an Exclusive OR gate 360, and the output of the gate 360 is connected to a delay element 362, which has delay value equal to the one half of the (chosen) linear range of the transfer function of FIG. 16. Furthermore, outputs of the delay element 362 and of AND Gate 310 are connected to an OR gate 364. It is, therefore, the output of the OR gate 364 that now provides overriding reset pulse to both flip-flops 301 and 302 that terminates pump up and pump down pulses to a charge pump. With such an arrangement, while readback peak pulses are inside of linear range (of transfer function of FIG. 16), the comparator 350 works exactly the same as the comparator 300 (FIG. 11). However, if readback peak pulses occur outside of the linear range (suspicious pulses), the signal path through elements 360, 362 and 364 provides mandatory reset for both flip-flops 301 and 302 and, thus, terminates the cycle of phase comparison for suspicious pulses. In this case, therefore, charges of known values are injected into PLL filter 144 (FIG. 3) and this fact, together with the polarity of the injected pulse is stored temporary in the status generation circuitry 370 and in the status registers 395.

The purpose of the status generation circuitry means 370 is to generate and to store temporary the "state" of the phase comparator 350 at each event of phase comparison and then to transfer these data to post-processing circuit for analysis and correction, if necessary, in the events of suspicious peak pulses. The status generation circuitry 370 may have variety of realizations. One possible realization includes positive edge short pulse former 372 that provides a short reset pulse for all sequential logic of the circuitry 370 at the start of each comparison cycle. This particular circuit 370 includes also negative edge pulse former 374, that, through the RS latch 375 produces "Large Correction" logical status signal in the event that a suspicious peak pulse occurred. However, if this is not the case, the OR gate 376 blocks out the negative edge pulse former 374 and the "Large Correction" signal. If "Large Correction" signal does occur, it is then submitted to two AND gates 377 and 378; other inputs of both being connected to the polarity (of large correction) flip-flop 380.

D-input of the polarity flip-flop 380 is connected to the pump up signal path through an auxiliary signal former circuit consisting of an OR gate 381 and a delay element 382. Clock input of polarity flip-flop is connected to the gated VCO cycle signal.

The described realization of circuitry 370 also contains a (small) delay element 385, input of which is connected to the XOR gate 360, negative edge pulse former 386 and a "Small Correction" flip-flops 387 and 388. D-inputs of flip-flops 387,388 are connected correspondingly to pump up and pump down signal paths. The purpose of that circuitry is to provide (at Q-outputs of flip-flops 387,388) "Small Up" and "Small Down" status signals to the status registers 395.

Q-outputs of the status registers 396–399 provide retimed synchronous (driven by NOTVCO clock) status signals "Large Up", "Large Down", "Small Up" and "Small Down" correspondingly to the post-processing circuitry 68.

Figure 18:
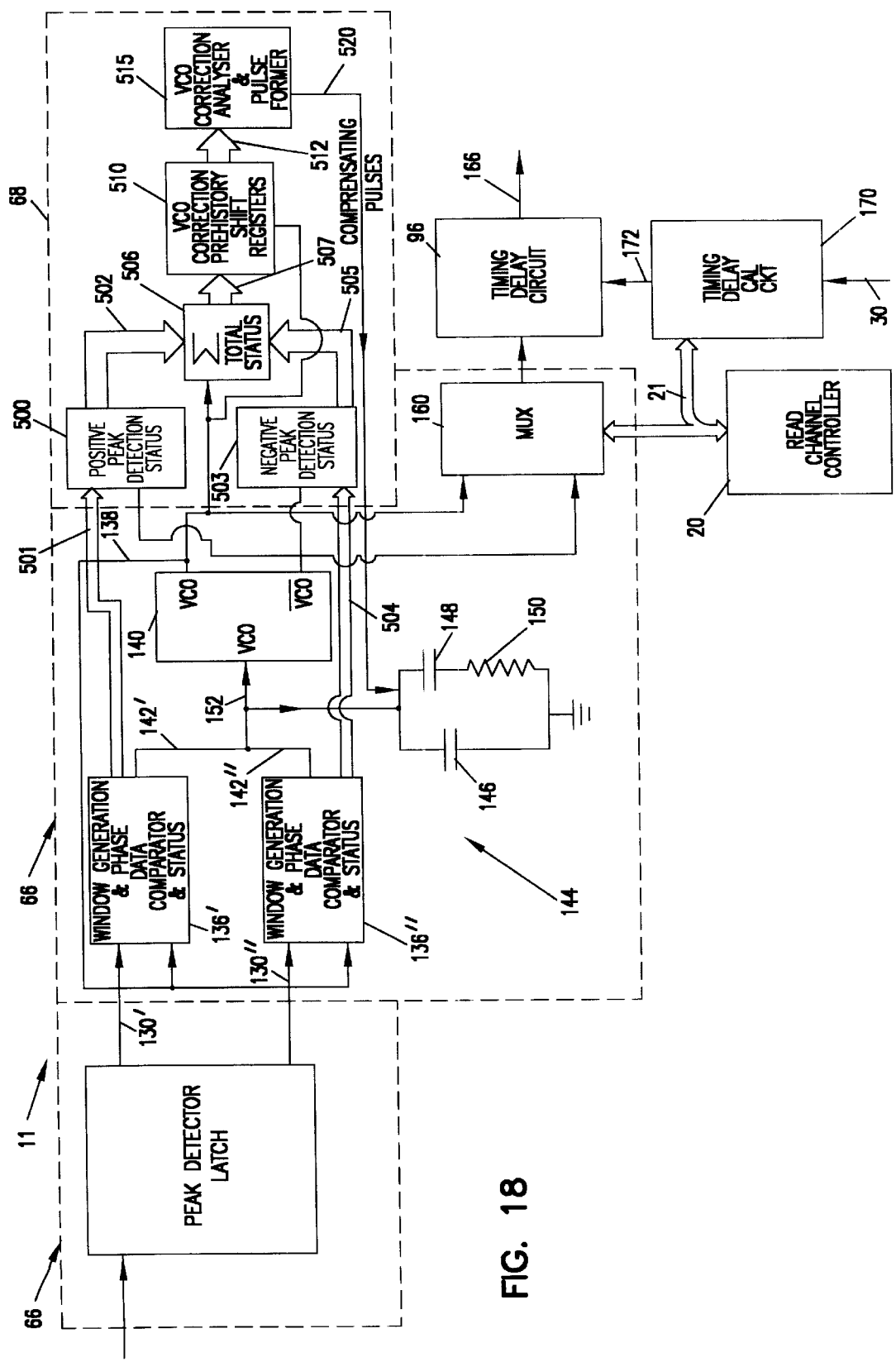
FIG. 18 is a functional block diagram of the self-synchronization subsystem of FIG. 1 with the post-processing feature.

The implementation of this alternative preferred embodiment of the present invention is visually summarized in FIG. 18, which is a functional block diagram of the self-synchronization subsystem 11 that utilizes the post-processing feature. The diagram FIG. 18 contains the same general blocks as that of FIG. 3 without post-processing feature. In addition, it also contains the post-processing circuitry shown generally as numeral 68.

The post-processing circuitry 68, in turn, contains a positive peak detection status circuit 500 with its input bus 501 and output bus 502, a negative peak detection status circuit 503 with its input bus 504 and output bus 505, a summer of two Statutes circuitry 506 with its output bus 507, a VCO correction prehistory shift register 510 with its output bus 512 and a false correction analyzer and pulse former 515 with the output signal path 520 to the loop filter 144.

The general architecture of blocks 500 and 503 has been already described above in conjunction with the modified phase-data comparator shown on the block diagram of FIG. 17. The status summer 506 is a simple circuit that deinterleaves two interleaved statuses (for positive and negative peak pulses) from blocks 500 and 503. The VCO correction prehistory shift registers circuit 510 is described sufficiently by its name. It is included into general block diagram of FIG. 18, since the present invention anticipates also a more sophisticated post-processing in a clock derivation (see below FIG. 19 and pertinent text), than a simple compensation of suspicious peak pulses. The false correction analyzer and pulse former 515 is also described sufficiently by its name. As already mentioned before, in the most elementary version of post-processing, block 515 simply injects (by way of signal path 520 ) into the loop filter 144 a charge that is equal in absolute value, but is opposite in polarity to that created by the modified phase-data comparator in response to a suspicious readback peak pulse.

FIG. 19 illustrates a generic hardware configuration for embodiment of more sophisticated post-processing, than simple compensation of suspicious readback peak pulses. Such sophisticated post-processing may take into account specific features of the code used and corresponding suspicious patterns which it will create in a peak detection channel of the present invention. In that case it is necessary to provide a specific code-dependent algorithm for post-processing (shown generally by numeral 530 ) to the false correction analyzer 515 and to implement it in hardware.

Although the magnetic recording channel 10 disclosed herein has been described as being implemented in a disc drive, it will be recognized that the present invention can readily be utilized in other recording channel applications, such as in a magnetic tape drive. Unless otherwise provided, for purposes of the claims below it will be understood that the term "magnetic recording readback channel" is not limited to disc drive applications.

It is to be understood that even though numerous characteristics and advantages of various embodiments of the present invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed.

What is claimed is:

1. A magnetic recording readback channel, comprising:
   (a) an equalizer which equalizes an input signal to an approximation of selected waveform, the equalizer including an analog, continuous-time frequency-domain prefilter which generates a preconditioned signal from the input signal, the equalizer further including a sampler which derives discrete-time samples appropriate for sequential sampled data decoding from the preconditioned signal and a sampling clock; and
   (b) a self-synchronizer which generates the sampling clock from differentiation of a readback signal by utilizing an analog continuous-time filtering channel which is different from the equalizer and configured in parallel to the equalizer, the self-synchronizer including a phase locked loop which generates the sampling clock from detected magnetic transitions on a magnetic medium and which corrects the sampling clock based upon moments of detected peak pulses in the readback signal, the self-synchronizer further including a timing delay circuit which delays the sampling clock by an optimal amount and calibrates the sampling clock to an optimal phase during a sector preamble readback.

2. The magnetic recording readback channel of claim 1 wherein the self-synchronizer comprises a latch for detection of the magnetic transitions on the magnetic medium by generating short pulses that correspond to positions of detected transitions and ignores a spurious noise, the latch comprising:
   (b)(i) a comparator with significant hysteresis thresholds working in parallel with another comparator with zero-thresholds;
   (b)(ii) edge-short-pulse-former receiving input from the comparator with the zero-thresholds;
   (b)(iii) delay element connected to an output of the edge-pulse-former;
   (b)(iv) D-type flip-flop with D-input connected to an output of the comparator with significant hysteresis thresholds and a clock input connected to the output of the comparator with zero thresholds; and
   (b)(v) short pulse formers connected to outputs of the D-flip-flop.

3. The magnetic recording readback channel of claim 1 further comprising:
   (c) a temporary asynchronous storage which stores status of phase comparisons status at each comparison event; and
   (d) post-processor, operatively coupled to the storage, which analyzes past status of phase comparisons in the storage to detect events of suspicious corrections of a voltage controlled oscillator (VCO) and to compensate, if necessary, by injecting neutralizing current pulses into the phase locked loop.

4. The magnetic recording readback channel of claim 3 further comprising
   (e) a coincidence-type data-phase comparator, operatively coupled to the temporary asynchronous storage, which is used to generate phase comparisons status at each comparison event, the coincidence-type data-phase comparator having a transfer function which is configured to be more suitable for post-processing.

5. The magnetic recording readback channel of claim 4 wherein the coincidence-type data-phase comparator generates phase comparisons status at each comparison event with at least:
   (e)(i) two D-type flip-flops for generating corresponding pump-up and pump-down pulse outputs while flip-flops are in excited logical states from edges of a compared, in-phase, input sampling clock to flip-flops;
   (e)(ii) a first gate with two inputs connected to outputs of both flip-flops that provides asynchronous reset signals to both flop-flops in the case of a small phase error and both flip-flops being in an excited logical state;
   (e)(iii) a delay element that defines and restricts the duration of phase comparison event when a large phase error occurs by providing a mandatory signal for termination of the comparison event, the delay element having an output which is provided to the coincidence-type data-phase comparator for use in post-processing;
   (e)(iv) a second gate with two inputs connected to outputs of both flip-flops that provides an indication that one and only one of the flip-flops is in the excited logical state, an output of the second gate being connected to the input of the delay element and to the coincidence-type data-phase comparator for use in post-processing; and
   (e)(v) a third gate with two inputs connected to outputs of the first gate and to the output of the delay element, an output of the third gate being connected to asynchronous overriding reset inputs of both flop-flops to terminate a comparison event.

6. The magnetic recording readback channel of claim 1 wherein sampler comprises a time-domain equalizer selected from a group consisting of: an analog continuous-time transversal equalizer, an analog discrete-time transversal equalizer, and an analog continuous-time double-domain transversal equalizer.

7. The magnetic recording readback channel of claim 6 wherein the time-domain equalizer comprises a filter selected from a group consisting of a digital finite impulse response (FIR) filter, and an analog continuous-time frequency-domain filter.

* * * * *